United States Patent
Schorr et al.

(10) Patent No.: US 12,471,894 B2
(45) Date of Patent: Nov. 18, 2025

(54) METHOD AND SYSTEM FOR CONTROLLING FLEXIBLE DEVICES IN PRESENCE OF ABNORMAL SENSOR SIGNALS

(71) Applicant: Intuitive Surgical Operations, Inc., Sunnyvale, CA (US)

(72) Inventors: Samuel B. Schorr, East Palo Alto, CA (US); Nicola Diolaiti, Menlo Park, CA (US); Wanxi Liu, Foster City, CA (US)

(73) Assignee: Intuitive Surgical Operations, Inc., Sunnyvale, CA (US)

( * ) Notice: Subject to any disclaimer, the term of this patent is extended or adjusted under 35 U.S.C. 154(b) by 506 days.

(21) Appl. No.: 17/762,327

(22) PCT Filed: Sep. 25, 2020

(86) PCT No.: PCT/US2020/052859
§ 371 (c)(1),
(2) Date: Mar. 21, 2022

(87) PCT Pub. No.: WO2021/062253
PCT Pub. Date: Apr. 1, 2021

(65) Prior Publication Data
US 2022/0273280 A1 Sep. 1, 2022

Related U.S. Application Data

(60) Provisional application No. 62/906,713, filed on Sep. 26, 2019.

(51) Int. Cl.
*A61B 17/00* (2006.01)
*A61B 34/20* (2016.01)
*A61B 34/30* (2016.01)
*A61B 34/37* (2016.01)
*B25J 9/16* (2006.01)

(52) U.S. Cl.
CPC ........ *A61B 17/00234* (2013.01); *A61B 34/37* (2016.02); *B25J 9/1653* (2013.01);
(Continued)

(58) Field of Classification Search
CPC .............. A61B 17/00234; A61B 34/37; A61B 2034/2051; A61B 2034/2061;
(Continued)

(56) References Cited

U.S. PATENT DOCUMENTS 10,166,678 B2 1/2019 Kamon et al.
10,299,868 B2 5/2019 Tsuboi et al.
(Continued)

FOREIGN PATENT DOCUMENTS

CN 106068175 A 11/2016
CN 108289720 A 7/2018
(Continued)

OTHER PUBLICATIONS

Joshua B. Gafford. "Real-Time Parameter Estimation of Biological Tissue Using Kalman Filtering." 2160: System Identification, Estimation, and Learning. Harvard University. Jun. 28, 2015. https://scholar.harvard.edu > files > 2160_final. 11 pages. Last accessed Mar. 11, 2025. (Year: 2015).*
(Continued)

*Primary Examiner* — Tan-Uyen T Ho
*Assistant Examiner* — Cherie M Poland
(74) *Attorney, Agent, or Firm* — Osha Bergman Watanabe & Burton LLP

(57) ABSTRACT

A computer-assisted medical system includes a flexible catheter configured to articulate along a degree of freedom, an actuator disposed at a proximal portion of the flexible catheter, an actuator sensor, and an articulation sensor. The actuator is configured to actuate the flexible catheter along the degree of freedom, the actuator sensor is configured to
(Continued)

provide actuator sensor signals representing movement of the actuator, and the articulation sensor is configured to provide articulation sensor signals representing articulation of the flexible catheter. The computer-assisted medical system further includes a controller coupled to the actuator and configured to, based on detecting an abnormality in a first articulation sensor signal, determine an articulation estimate of the flexible catheter based on a model of the flexible catheter applied to a first actuator sensor signal, and control the actuator based on the articulation estimate.

19 Claims, 11 Drawing Sheets

(52) U.S. Cl.
CPC ... *B25J 9/1679* (2013.01); *A61B 2017/00398* (2013.01); *A61B 2034/2051* (2016.02); *A61B 2034/2061* (2016.02); *A61B 2034/301* (2016.02)

(58) Field of Classification Search
CPC ..... A61B 2034/301; A61B 2034/00398; B25J 9/1653; B25J 9/1679
See application file for complete search history.

(56) References Cited

U.S. PATENT DOCUMENTS

| | | | | |
|---|---|---|---|---|
| 11,832,891 | B2* | 12/2023 | Barbagli | .......... A61B 17/00234 |
| 2013/0190726 | A1* | 7/2013 | Kesner | .............. A61M 25/0116 |
| | | | | 604/95.01 |
| 2018/0333214 | A1 | 11/2018 | Han et al. | |
| 2020/0078096 | A1* | 3/2020 | Barbagli | ................ A61B 34/32 |

FOREIGN PATENT DOCUMENTS

| | | | |
|---|---|---|---|
| CN | 109891352 A | 6/2019 | |
| JP | 2014124229 A | 7/2014 | |
| WO | WO-2016191298 A1 | 12/2016 | |
| WO | WO-2018006046 A1 * | 1/2018 | ....... A61B 17/00234 |
| WO | WO-2018055229 A1 | 3/2018 | |
| WO | WO-2018122946 A1 | 7/2018 | |

OTHER PUBLICATIONS

Andrea Bako and Nabil Simaan. "Hybrid motion/force control of multi-backbone continuum robots." The International Journal of Robotics Research. 2016, vol. 35(4)422-434. (Year: 2016).*
Vertut, J, and Coiffet, P., "Robot Technology: Teleoperation and Robotics Evolution and Development," English translation, Prentice-Hall, Inc., Inglewood Cliffs, NJ, USA 1986, vol. 3A, 332 pages.
International Search Report issued in corresponding international application No. PCT/US2020/052859 mailed Dec. 17, 2020 (6 pages).
Written Opinion of the International Searching Authority issued in corresponding international application No. PCT/US2020/052859 mailed Dec. 17, 2020 (8 pages).
Office Action for Chinese Application No. CN20208066519, mailed May 9, 2025, 28 pages.

* cited by examiner

METHOD AND SYSTEM FOR CONTROLLING FLEXIBLE DEVICES IN PRESENCE OF ABNORMAL SENSOR SIGNALS

CROSS-REFERENCE TO RELATED APPLICATIONS

This application claims the benefit of priority under 35 U.S.C. § 119(a) to Patent Cooperation Treaty Application No. PCT/US2020/052859, filed Sep. 25, 2020, which claims the benefit of priority under 35 U.S.C. § 119(e) to U.S. Provisional Patent Application Ser. No. 62/906,713, filed on Sep. 26, 2019; both applications are hereby incorporated by reference herein in their entireties.

BACKGROUND

Field of Invention

Examples described herein relate to improved robot-assisted and/or medical devices, systems, and methods.

Overview

Flexible devices may be used to perform tasks at worksites, such as when the worksites are accessible through one or more orifices (e.g., one or more openings in a human, animal, machinery, etc.). For example, a minimally invasive medical procedure may be performed through an orifice to reduce an amount of tissue that is damaged during the medical procedure, thereby reducing patient recovery time, discomfort, and harmful side effects. The orifice may be a natural orifice in a patient anatomy or a surgical incision. An operator (e.g., a physician, a physician assistant, a surgeon, etc.) may insert a minimally invasive medical instrument (including surgical, diagnostic, therapeutic, and/or biopsy instruments) through the orifice to reach a target tissue location. A flexible and/or steerable elongate device, such as a flexible catheter, may be used to reach a region of interest within the patient anatomy via an anatomic passageway. Control of such an elongate device by an operator may involve the management of multiple degrees of freedom including insertion and retraction of the elongate device with respect to the patient anatomy and steering of the device. Versatile systems and methods for instrument control are needed to address these and other challenges.

SUMMARY

In general, in one aspect, one or more embodiments relate to a computer-assisted medical system comprising: a flexible catheter configured to articulate along a degree of freedom; an actuator disposed at a proximal portion of the flexible catheter, wherein the actuator is configured to actuate the flexible catheter along the degree of freedom; an articulation sensor configured to provide articulation sensor signals representing articulation of the flexible catheter; an actuator sensor configured to provide actuator sensor signals representing movement of the actuator; and a controller coupled to the actuator and configured to, based on detecting an abnormality in a first articulation sensor signal: determine an articulation estimate of the flexible catheter based on a model of the flexible catheter applied to a first actuator sensor signal; and control the actuator based on the articulation estimate.

In general, in one aspect, one or more embodiments relate to a non-transitory machine-readable medium comprising machine-readable instructions that, when executed by one or more processors associated with a medical system, cause the medical system to: obtain articulation sensor signals from an articulation sensor, wherein the articulation sensor signals represent an articulation of a flexible catheter; obtain actuator sensor signals from an actuator sensor, wherein the actuator sensor signals represent movement of an actuator configured to drive articulation of the flexible catheter; and based on detecting an abnormality in a first articulation sensor signal: determine an articulation estimate based on a model of the flexible catheter applied to a first actuator sensor signal, and control the actuator based on the articulation estimate.

In general, in one aspect, one or more embodiments relate to a method for operating a medical system, comprising: obtaining articulation sensor signals from an articulation sensor, wherein the articulation sensor signals represent an articulation of a flexible elongate device; obtaining actuator sensor signals from an actuator sensor, wherein the actuator sensor signals represent movement of an actuator configured to drive articulation of the flexible elongate device; and based on detecting an abnormality in a first articulation sensor signal: switching to an actuator feedback control mode, comprising: determining an articulation estimate based on a model of the flexible elongate device applied to a first actuator sensor signal, and controlling the actuator based on the articulation estimate.

Other examples will be apparent from the following description and the appended claims.

DETAILED DESCRIPTION

Figure 1:
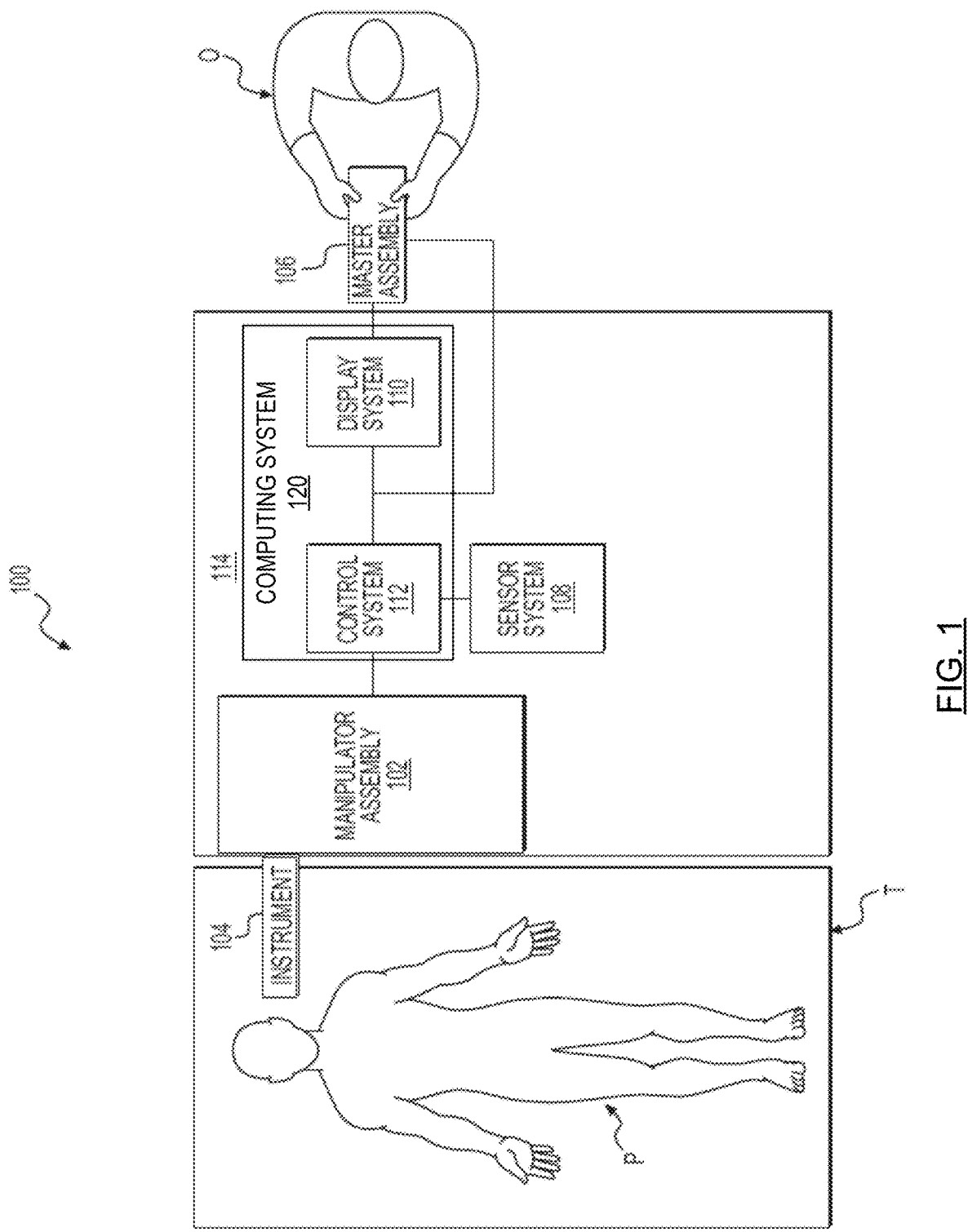
FIG. 1 diagrammatically shows a computer-assisted medical system, in accordance with one or more embodiments.

Specific embodiments of the disclosure will now be described in detail with reference to the accompanying figures. Like elements in the various figures are denoted by like reference numerals for consistency.

In the following detailed description of embodiments of the disclosure, numerous specific details are set forth. However, it will be apparent to one of ordinary skill in the art that some embodiments may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

Although some of the examples described herein refer to medical procedures and medical tools, the examples described herein may apply to medical and non-medical procedures, and to medical and non-medical tools. For example, the tools, systems, and methods described herein may be used for non-medical purposes including industrial uses, general robotic uses, and sensing or manipulating non-tissue work pieces. Other example applications involve cosmetic improvements, imaging of human or animal anatomy, gathering data from human or animal anatomy, setting up or taking down the system, and training medical or non-medical personnel. Additional example applications include use for procedures on tissue removed from human or animal anatomies (without return to a human or animal anatomy), and performing procedures on human or animal cadavers. Further, these techniques can also be used for medical treatment or diagnosis procedures that do, or do not, include surgical aspects.

In general, embodiments of the disclosure may enable responding to one or more fault conditions of a computer-assisted medical system that includes a flexible catheter. More specifically, a control method may be used to address a temporary fault condition. The fault condition may introduce an error to a feedback signal obtained from an articulation sensor, e.g., a sensor that measures articulation (e.g., shape) of the flexible catheter. The error, while present, may make the feedback signal less suitable or unsuitable for closed-loop control. Although the feedback signal may be used to control position and/or movement of the flexible catheter under regular operating conditions, when the fault condition is present, the control method may rely on an alternate feedback signal. The alternate feedback signal may be based on an actuator sensor signal, e.g., a sensor signal representing the movement of an actuator that drives the articulation. For example, the actuator sensor signal may be processed by a simulation model of the flexible catheter to obtain an estimate of the actual articulation. The estimate may then be used as the alternate feedback signal, to control the articulation.

Fault conditions that may render the feedback signal obtained from the articulation sensor useless or less useful may include mechanical vibrations. The fault condition(s) may be time limited. For example, the mechanical vibration may temporarily occur during insertion or removal of a tool into/from the flexible catheter. Accordingly, the alternate feedback signal may temporarily be used for control, until an appropriate feedback signal obtained from the articulation sensor returns. Disruptions that would otherwise result from deactivating the control of the articulation may thus be avoided.

Referring now to the drawings, in which like reference numerals represent like parts throughout the several views, FIG. 1 shows a simplified diagram of a computer-assisted medical system (100) in accordance with one or more embodiments. The computer-assisted medical system (100) may be suitable for use in, for example, surgical, diagnostic, therapeutic, and/or biopsy procedures. While some embodiments are provided herein with respect to such procedures, any reference to medical (e.g., surgical) instruments and medical methods is non-limiting. The systems, instruments, and methods described herein may be used for animals, human cadavers, animal cadavers, portions of human or animal anatomy, non-surgical diagnosis, as well as for industrial systems and general robotic or teleoperational systems.

As shown in FIG. 1, the computer-assisted medical system (100) generally includes a manipulator assembly (102) for operating a medical instrument (104) to perform various procedures on a patient (P) in accordance with one or more embodiments of the invention. The medical instrument (104) may include a flexible catheter and may be steered when extended into an internal site within the body of the patient (P).

The manipulator assembly (102) and the instrument (104) may be teleoperated, non-teleoperated, or a hybrid teleoperated and non-teleoperated assembly with select degrees of freedom of motion that may be motorized and/or teleoperated and select degrees of freedom of motion that may be non-motorized and/or non-teleoperated. The manipulator assembly (102) may be mounted to an operating table (T), or to a main support (114) (e.g., a cart, stand, second table, and/or the like). A master assembly (106) may allow an operator O (e.g., a surgeon, a clinician, or a physician) to view the interventional site and to control the manipulator assembly (102), including the instrument (104).

The master assembly (106) may be located at an operator console which may be located in the same room as operating table (T), such as at the side of a surgical table on which patient (P) is located. However, it should be understood that the operator (O) can be located in a different room or a completely different building from patient (P). The master assembly (106) may include one or more control devices for controlling the manipulator assembly (102). The control devices may include any number of a variety of input devices, such as joysticks, trackballs, data gloves, trigger-guns, hand-operated controllers, voice recognition devices, body motion or presence sensors, and/or the like. To provide the operator (O) a strong sense of directly controlling the instrument (104), the control devices may be provided with the same degrees of freedom as the associated medical instrument (104). In this manner, the control devices provide operator (O) with telepresence or the perception that the control devices are integral with medical instruments (104).

In one or more embodiments, the manipulator assembly (102) supports the medical instrument (104) including the flexible catheter, and may include a kinematic structure of one or more non-servo controlled links (e.g., one or more links that may be manually positioned and locked in place, generally referred to as a set-up structure), and/or one or more servo controlled links (e.g., one or more powered links that may be controlled in response to commands from the control system), and a manipulator. The manipulator assembly (102) may include a plurality of actuators (e.g., motors) that drive the medical instrument (104) in response to commands from the control system (e.g., a control system (112)).

The actuators may include drive systems that, when coupled to the medical instrument (104), may advance the medical instrument (104) into a naturally or surgically created anatomic orifice. Other drive systems may move the distal end of the medical instrument (104) in one or more degrees of freedom, which may include at least a linear insertion/retraction motion and one or more articulation motions to orient the instrument, as discussed in detail below. Additionally, the actuators may be used to actuate an articulable end effector of medical instrument (104) for grasping tissue in the jaws of a biopsy device and/or the like. Actuator sensors (e.g., resolvers, encoders, potentiometers, and other mechanisms) may provide sensor data to the medical system (100) describing the position, rotation, and/or orientation of motor shafts. This actuator sensor data may be used to determine motion of the objects manipulated by the actuators. The actuator sensors may comprise proximal sensors located proximal to other sensors used to measure a distal portion of the medical instrument or along the medical instrument.

The computer-assisted medical system (100) may include a sensor system (108) with one or more sub-systems for receiving information about the instrument (including the flexible catheter) of manipulator assembly (102). Such sub-systems may include a position/location sensor system (e.g., an electromagnetic (EM) sensor system); a shape sensor system for determining the position, orientation, speed, velocity, pose, and/or shape of a distal portion and/or of one or more segments along a flexible body that may make up the flexible catheter housing the instrument (104); and/or a visualization system for capturing images from the distal end of the instrument (104). One or more sensors of the sensor system (108) may comprise distal sensors used to measure at a distal portion of the flexible catheter housing the instrument and/or along the flexible catheter.

In one or more embodiments, the computer-assisted medical system (100) also includes a display system (110) for displaying an image or representation of the surgical site and medical instrument (104), including the flexible catheter, generated by sub-systems of sensor system (108), recorded pre-operatively or intra-operatively using image data from imaging technology and/or a real time image such as, computed tomography (CT), magnetic resonance imaging (MRI), fluoroscopy, thermography, ultrasound, optical coherence tomography (OCT), thermal imaging, impedance imaging, laser imaging, nanotube X-ray imaging, endoscopic images, and/or the like. The pre-operative or intra-operative image data may be presented as two-dimensional, three-dimensional, or four-dimensional (including e.g., time based or velocity-based information) images and/or as images from models created from the pre-operative or intraoperative image data sets. The display system (110) and the master assembly (106) may be oriented so the operator (O) can control the medical instrument (104) and the master assembly (106) with the perception of telepresence.

Continuing with FIG. 1, the computer-assisted medical system (100) may also include a control system (112). The control system (112) includes at least one memory and at least one computer processor (not shown) for effecting control between the medical instrument (104), master assembly (106), sensor system (108), and display system (110). The control system (112) also includes programmed instructions (e.g., a non-transitory machine-readable medium storing the instructions) to implement some or all of the methods discussed below, including instructions for operating in presence of unreliable or less reliable sensor signals as described with reference to the flowcharts of FIGS. 7, 8, 9, and 10. While the control system (112) is shown as a single block in the simplified schematic of FIG. 1, the system may include multiple data processing circuits with one portion of the processing optionally being performed on or adjacent to the manipulator assembly (102), another portion of the processing being performed at master assembly (106), and/or the like. Any of a wide variety of centralized or distributed data processing architectures may be employed. Similarly, the programmed instructions may be implemented as a number of separate programs or subroutines, or they may be integrated into a number of other aspects of the systems described herein.

In one or more embodiments, the control system (112) may receive force and/or torque feedback from the medical instrument (104). Responsive to the feedback, the control system (112) may transmit signals to the master assembly (106). In some examples, the control system (112) may transmit signals instructing one or more actuators of manipulator assembly (102) to move the medical instrument (104) (e.g., to move a flexible catheter).

Any suitable conventional and/or specialized actuators may be used to actuate links or segments of the manipulator assembly (102) and/or the instrument (104). The one or more actuators may be separate from, or integrated with, manipulator assembly (102).

In one or more embodiments, the control system (112) may include a hierarchical control architecture. The hierarchical control architecture may include a supervisor state machine, a mid-level controller, and a servo controller (feedback controller) for each of the actuators. The supervisor state machine may be event driven. Based on an event, the supervisor state machine may send a behavioral primitive to the mid-level controller. A behavioral primitive may be a high-level command, specifying an overall goal, such as a target configuration of the manipulator assembly (102). In response, the mid-level controller may issue servo commands to the servo controllers, causing the actuators to move. More specifically, the mid-level controller may perform numerical computations to configure, initialize and reset the servo controllers, based on the behavioral primitive. For example, the mid-level controller may send parameters specifying positions and/or trajectories to the servo controllers. The servo controllers may then drive the actuators, based on the commands received from the mid-level controller. The servo controllers may report back to the supervisor state machine, for example, to indicate whether movements have been successfully executed, according to the servo commands. Additional aspects of the control system (112) are described below, with reference to FIGS. 7, 8, 9, and 10. In one or more embodiments, the supervisor state machine and the mid-level controller are low latency. For example, a response to an event may be provided within 50 ms. Each of the servo controllers may operate closed loop using a proportional integral derivative (PID), proportional derivative (PD), full state feedback, sliding mode, and/or various other control schemes. The feedback signal for a servo controller may be obtained from, for example, an encoder or resolver of the actuator being controlled by the servo controller. Alternatively, as further discussed below, a servo controller may also rely on other sensors for feedback. More specifically, a servo controller for controlling an articulation (e.g., bending) of a flexible catheter may use signals from an articulation sensor, e.g., a bend or shape sensor to control the articulation or bending of the flexible catheter. A more detailed description of various aspects of the control system (112) is provided below with reference to FIGS. 7, 8, 9, and 10.

Continuing with FIG. 1, the control system (112) may operate in various modes, in addition to the above-described servo-control modes. For example, the control system (112) may control one or more of the joints of the manipulator assembly, described below, to float. A floating joint may be back-driven by an externally applied force without a control algorithm or a braking force counteracting sufficient externally applied force. For example, a user may apply a force meeting one or more criteria (e.g., for magnitude, direction, duration, frequency, etc.) to a link distal to the floating joint, causing the back-driving of the floating joint. A floating joint, in particular when floating in a degree of freedom affected by gravity (e.g., a vertical joint or in a non-horizontal direction), may further be gravity-compensated. In addition, a friction compensation may facilitate the back-driving. Additionally or alternatively, a floating joint may also be controlled to impose other characteristics such as a certain level of damping.

In one or more embodiments, floating joints may be particularly beneficial during a setup phase, allowing an assistant to manually position and/or orient the manipulator assembly (102) by back-driving the floating joints, during a setup phase in preparation for performing a procedure using the instrument (104). Multiple control modes may be combined during operation of the manipulator assembly, e.g., some joints may be position controlled to resist or rebound from external articulation of those joints, while other joints may be floating and facilitate external articulation of those other joints.

The control system (112) may optionally include a virtual visualization system to provide navigation assistance to the operator (O) when controlling the medical instrument (104) during an image-guided surgical procedure. Virtual navigation using the virtual visualization system may be based upon reference to an acquired preoperative or intraoperative dataset of anatomic passageways.

During a virtual navigation procedure, the sensor system (108) may be used to compute an approximate location of the medical instrument (104) with respect to the anatomy of the patient (P). The location can be used to produce both macro-level (external) tracking images of the anatomy of the patient (P) and virtual internal images of the anatomy of the patient (P). The system may include one or more electromagnetic (EM) sensors, fiber optic sensors, and/or other sensors to register and display a medical instrument together with preoperatively recorded surgical images, such as those from a virtual visualization system. For example, PCT Publication WO 2016/191298 (published Dec. 1, 2016) (disclosing "Systems and Methods of Registration for Image Guided Surgery"), which is incorporated by reference herein in its entirety, discloses an example system.

The computer-assisted medical system (100) may further include optional operations and support systems (not shown) such as illumination systems, steering control systems, irrigation systems, and/or suction systems. In some embodiments, the computer-assisted medical system (100) may include more than one manipulator assembly and/or more than one master assembly. The exact number of teleoperational manipulator assemblies may depend on the surgical procedure and the space constraints within the operating room, among other factors.

In some embodiments, the manipulator assembly (102), the control system (112), the sensor system (108), and the display system (110) may all be supported by the support structure (114) or may be integrated into the support structure (114). Alternatively, one or more components (e.g., the manipulator assembly (102), the control system (112), the sensor system (108), and/or the display system (110)) may be mounted to the operating table (T) or integrated into the master assembly (106).

Figure 2:
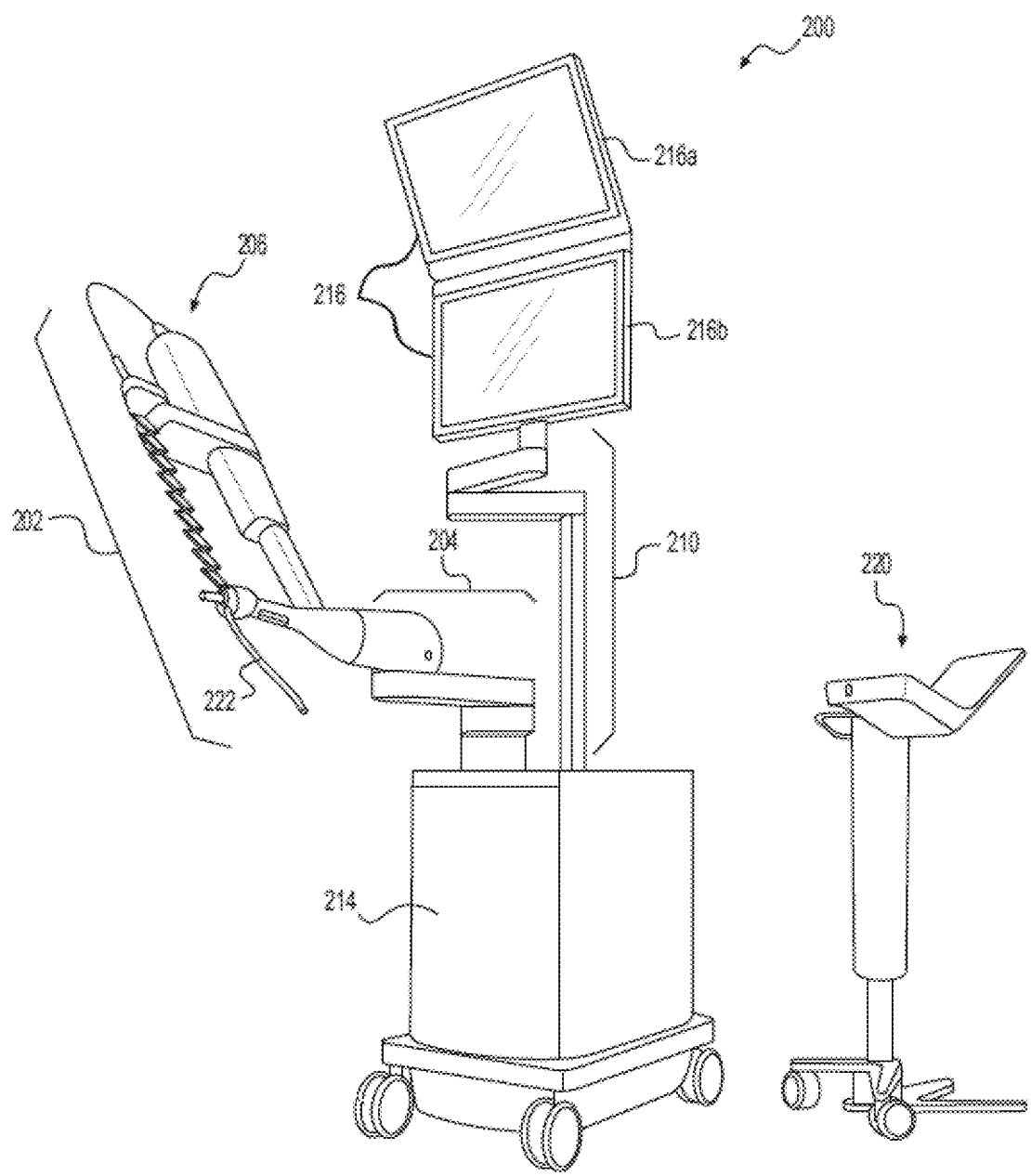
FIG. 2 shows an example of a computer-assisted medical system, in accordance with one or more embodiments.

FIG. 2 illustrates, an example of a computer-assisted medical system (200), in accordance with one or more embodiments. The computer-assisted medical system (200) may include a master control (220) and a system cart (214) which supports a manipulator assembly (202) and a display system (216). The manipulator assembly (202) may be configured to support and position an elongate device such as the flexible catheter (222). Various elongate devices are described in PCT/US18/43041 (filed Jul. 20, 2018) (disclosing "Flexible elongate device systems and methods"), which is incorporated by reference herein in its entirety. The system cart (214) supports the display system (216) which includes the monitor support arm (210), and the display monitors (216a, 216b).

The computer-assisted medical system (200) of FIG. 2 also includes a master control (220) according to one or more embodiments, some aspects of which are discussed above with respect to master assembly (106). The master control (220) may include various input controls for an operator (e.g., the operator (O), FIG. 1) to use for interactively controlling operations of the manipulator assembly (202), for example functions performed by the instrument manipulator (206). In one or more embodiments, the master control (220) includes a scroll wheel and a trackball on the surface, which allows the operator to control aspects of the computer-assisted medical system (200). In an example implementation, the scroll wheel may be rolled forwards or backwards in order to control the advancement/insertion or retraction of a medical instrument (e.g., the flexible catheter (222)) with respect to the patient anatomy, and the trackball may be rolled in various directions by an operator in order to steer the position of the distal end portion and/or distal tip of the flexible catheter (222), for example to control bend or articulation. Various systems and methods related to motion control consoles are described in PCT/US18/44419 (filed Jul. 30, 2018) (directed to "Systems and methods for safe operation of a device") and U.S. patent application Ser. No. 16/049,640 (filed Jul. 30, 2018) (disclosing "Systems and methods for steerable elongate device"), which are incorporated by reference herein in their entireties.

Figure 3:
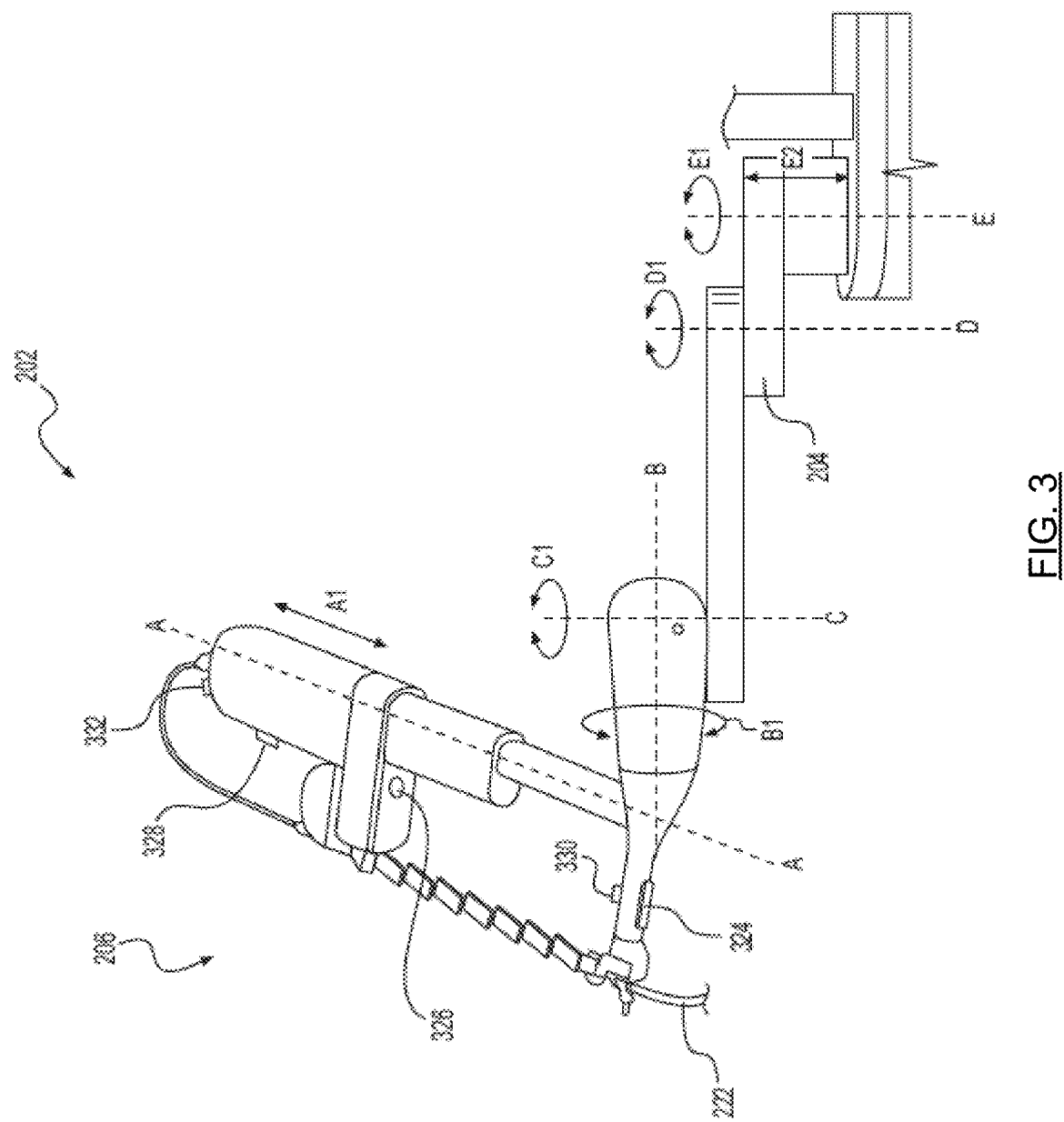
FIG. 3 shows an example of a manipulator assembly including an instrument and a manipulator arm holding the instrument, in accordance with one or more embodiments.

FIG. 3 shows the manipulator assembly (202) including an instrument manipulator (206) coupled to the support structure (204) in accordance with one or more embodiments of the invention. The links of the support structure (204) may include one or more nonservo controlled links (e.g., which may be manually positioned and locked into place) and/or one or more servo-controlled links (e.g., powered links that may be controlled in response to commands from a control system). The support structure (204) provides adjustments to position the instrument manipulator (206) at an optimal position and orientation and/or position the flexible catheter (222) to optimally position the flexible catheter (222) relative to the patient anatomy or other medical devices. For example, the support structure (204)

may provide for a rotation (E1) about the axis (E), the extension/retraction (E2) along the axis (E), the rotation (D1) about the axis (D), and the rotation (C1) about the axis (C), and the rotation (B1), about the axis (B), to position the instrument manipulator (206) in a desired position relative to the table (T), medical devices, and/or the patient (P).

In some embodiments, optimal location and orientation can include alignment of the instrument manipulator (206) with respect to the patient anatomy, for example, for optimal positioning of the flexible catheter (222) to minimize friction of the flexible catheter (222) positioned within the patient anatomy (e.g. anatomical openings, patient vasculature, patient endoluminal passageways, etc.) or within medical devices coupled to patient anatomy (e.g., cannulas, trocars, endotracheal tubes (ETT), laryngeal esophageal masks (LMA), etc.). In other embodiments, optimal location and orientation of the instrument manipulator (206) may additionally or alternatively include optimizing the operator (O) ergonomics by providing sufficient operator workspace and/or ergonomic access to the flexible catheter (222) when utilizing various medical tools such as needles, graspers, scalpels, grippers, ablation probes, visualization probes, and/or the like, with the flexible catheter (222).

The instrument manipulator (206) may be further configured to provide teleoperational, robotic control, or other form of controlled translation or manual translation A1 along axis A to provide for insertion and retraction of the flexible catheter (222) with respect to the patient anatomy.

Each adjustment (e.g., A1, B1, C1, D1, E1, and E2) may be actuated by either robotic control or by manual intervention by an operator. For example, in one embodiment, each rotational or linear adjustment may be maintained in a stationary configuration using brakes such that depression of one or more buttons and switches releases one or more corresponding brakes allowing an operator to manually position the instrument manipulator. Additionally or alternatively, one or more adjustments may be controlled by one or more actuators (e.g., motors) such that an operator may use a button or switch to actuate a motor to alter the support structure (204) and/or the instrument manipulator (206) to position the manipulator assembly (202) in a desired configuration, typically to provide an optimal position and orientation of the instrument manipulator (206).

Continuing with FIG. 3, the manipulator assembly (202) may be equipped with various control buttons (324, 326, 328, 330) which may be used for various purposes such as an unlocking of the support structure (204) for free movement and adjustment of the coupled links to allow for adjustments C1, D1, E1, and/or E2 and/or linear adjustment A1 for manual translational movement by an operator rather than by robotic control to insert/retract a medical instrument (e.g., the flexible catheter (222)). In one or more embodiments, for safety purposes, the instrument manipulator (206) may only be manually movable in one direction along the linear axis A, such as retraction, and is not manually movable in the direction along the linear axis A that corresponds to insertion of the medical instrument, in order to prevent an operator from inadvertently or undesirably advancing the medical instrument with respect to the patient anatomy, which may result in harm to the patient. In another example, robotic or manual control of the rotational motion B1 about axis B may be enabled by depressing a switch. Further, one or more buttons may be used to control visual indicators, markers, and or images shown on monitors (216a, 216b), and/or a touchscreen on the master control (220).

Figure 4:
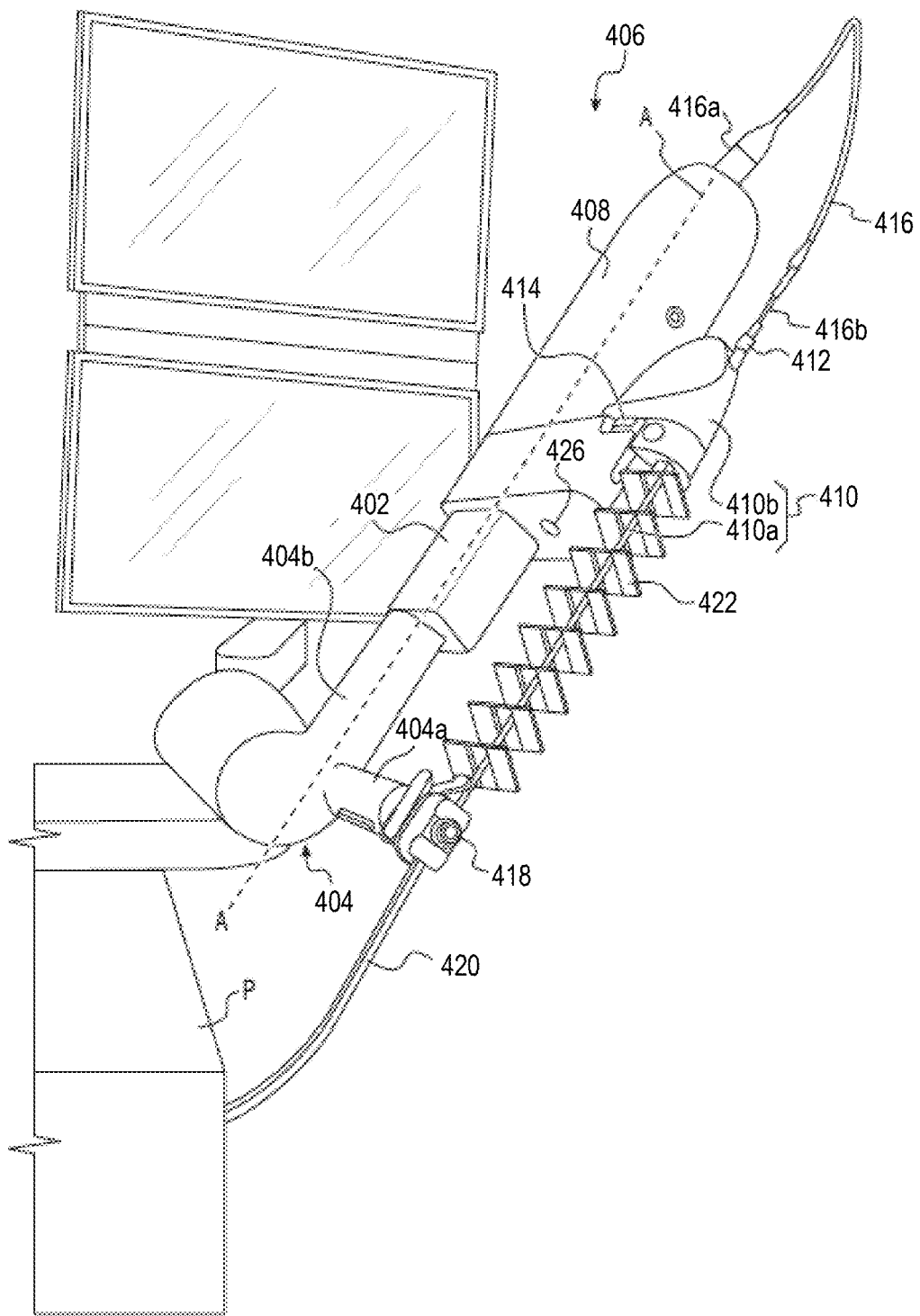
FIG. 4 shows an example of an instrument manipulator including a catheter assembly, in accordance with one or more embodiments.

FIG. 4 shows an example of an instrument manipulator (406), which may be substantially similar to the instrument manipulator (206). The instrument manipulator (406) may include a base (404), an insertion stage (402), and an instrument carriage (408) to which a catheter assembly (410) is coupled. In one or more embodiments, the instrument manipulator (406) provides for insertion and retraction of the catheter assembly (410), with respect to the patient anatomy, by moving the instrument carriage (408) and insertion stage (402) in a telescoping manner relative to the base (404) and along the linear axis A, as further illustrated in FIG. 6. The instrument manipulator (406), thus, provides an insertion degree of freedom for the insertion and retraction of the flexible catheter (410a) along the linear axis A. In a medical scenario, the insertion may advance the flexible catheter (410a) into the patient anatomy, whereas the retraction may withdraw the flexible catheter (410a) from the patient anatomy.

The base (404) includes a shaft portion (404a) and a main portion (404b). As described in detail below, the shaft portion (404a) removably couples to a device connector or swivel connector (418) which receives the flexible catheter (410a). The insertion stage (402) is coupled to the main portion (404b) of the base (404) and translates along the main portion (404b). The instrument carriage (408) is coupled to and translates along the insertion stage (402). The catheter assembly (410) may include a flexible catheter (410a) and a control assembly (410b). The instrument carriage (408) couples to the control assembly (410b) at an instrument interface (414) of the instrument carriage (408). The instrument manipulator (406) also couples to a probe assembly (416) which includes a probe (416b) and a probe connector (416a). The probe assembly (416) may insert into a working lumen of the flexible catheter (410a) through the connector (412) on the control assembly (410b) and may run through the flexible catheter (410a). The probe (416b) may include, for example, a viewing scope assembly that provides images of a surgical site. The instrument carriage (408) may include electronic and optical components providing probe (416b) with endoscopic capabilities. In some embodiments, the probe assembly (416) may be detached from the instrument manipulator (406) and flexible catheter control assembly (410b), and removed from the catheter assembly (410). Alternative instruments such as biopsy needles, ablation tools, and other flexible instruments may be coupled to the instrument manipulator (406) and/or the catheter assembly (410), through the flexible catheter (410a) working lumen.

Continuing with FIG. 4, the device connector or swivel connector (418) may include a manipulator interface which may be removably coupled to the base (404), a distal end which may be removably coupled to a patient medical device (420), e.g., an endotracheal tube, and a proximal end which may receive the flexible catheter (410a). The patient medical device (420) (e.g., an endotracheal tube, a laryngeal mask airway, a cannula, etc.) may be fixed to the patient anatomy to facilitate insertion of various medical devices into the patient anatomy. For example, the patient medical device (420) may be an endotracheal tube inserted into the mouth and trachea of the patient (P) to provide a conduit for the flexible catheter (410a) to be navigated within the lungs of the patient (P) to facilitate imaging, biopsy, and/or treatment. Various systems and methods related to device connectors are described in PCT/US2018/017085 (filed Feb. 6, 2018) (disclosing "Systems and methods for coupling components of a medical system"), which is incorporated by reference herein in its entirety. In some embodiments, the flexible catheter (410a) runs through a catheter guide (422), which is a selectively collapsible and extendable device that supports the length of the flexible catheter (410a) during movement of the instrument carriage (408). The flexible catheter (410a) without guidance may buckle in regions with no lateral support, e.g., in the space between the instrument interface (414) and the device connector (418). To avoid the buckling, the catheter guide (422) may operate as an anti-buckling guide by providing lateral support to the flexible catheter (410a). Various systems and methods related to catheter guides are described in PCT/US2017/041160 (filed Jul. 7, 2017) (disclosing "Guide apparatus for delivery of an elongate device and methods of use"), which is incorporated by reference herein in its entirety.

FIG. 5A is a simplified diagram of a computer-assisted medical system (500) in accordance with one or more embodiments. While the previously discussed figures primarily illustrate aspects of the overall computer assisted medical system (100) and the instrument manipulator (206), FIG. 5A and FIG. 5B primarily illustrate aspects related to the flexible catheter (502). The computer-assisted medical system (500) may be similar to the computer-assisted medical system (100) previously introduced with reference to FIG. 1. The computer-assisted medical system (500) may include the flexible catheter (502) (or more generally, an elongate flexible device) on an instrument interface (504). The instrument interface may be the physical interface that enables the coupling of the flexible catheter to other components of the computer-assisted medical system (500). In the example of FIG. 4, the instrument interface may be part of the instrument carriage (408).

In one or more embodiments, the flexible catheter (502) includes a flexible body (516) having a proximal portion (517) and a distal portion (518) (e.g., a tip portion). The flexible body (516) may have an outer diameter of approximately 3 mm Other flexible body outer diameters may be larger or smaller.

The flexible body (516) may include a lumen or channel (521) sized and shaped to receive a medical instrument (526), as shown in FIG. 5B. FIG. 5B is a simplified diagram of the flexible body (516) with the medical instrument (526) extended, in accordance with one or more embodiments. The medical instrument (526) may be used for procedures including but not limited to surgery, biopsy, ablation, illumination, irrigation, and/or suction. For example, the medical instrument (526) may be a flexible bronchial instrument, such as a bronchoscope or bronchial catheter, for use in examination, diagnosis, biopsy, or treatment of a lung. The medical instrument (526) may also be suited for navigation and treatment of other tissues, via natural or surgically created connected passageways, in any of a variety of anatomic systems, including the colon, the intestines, the kidneys and kidney calices, the brain, the heart, the circulatory system including vasculature, and/or the like.

The medical instrument (526) may be deployed through the lumen (521) of the flexible body (516) and may be used at a target location within the anatomy. The medical instrument (526) may include, for example, image capture probes, biopsy instruments, laser ablation fibers, and/or other surgical, diagnostic, or therapeutic tools. Medical tools may include end effectors having a single working member such as a scalpel, a blunt blade, an optical fiber, an electrode, and/or the like. Other end effectors may include, for example, forceps, graspers, scissors, clip appliers, and/or the like. Other end effectors may further include electrically activated end effectors such as electrosurgical electrodes, transducers, sensors, and/or the like. In one or more embodiments, the medical instrument (526) is a biopsy instrument which may be used to remove sample tissue or a sampling of cells from a target anatomic location. The medical instrument (526) may be used with an image capture probe also within the flexible body (516).

Returning to FIG. 5A, the medical instrument (526) may be an image capture probe that includes a distal portion with a stereoscopic or monoscopic camera at or near the distal portion (218) of the flexible body (516) for capturing images (including video images) that are processed by a visualization system (531) for display and/or provided to the tracking unit (530) to support tracking of the distal portion (518) and/or one or more of the segments (524). The image capture probe may include a cable coupled to the camera for transmitting the captured image data. In some examples, the image capture instrument may be a fiber-optic bundle, such as a fiberscope, that couples to the visualization system (531). Alternatively, the medical instrument (526) may itself be the image capture probe. The medical instrument (526) may be advanced from the opening of the lumen (521) to perform the procedure and then retracted back into the lumen when the procedure is complete. The medical instrument (526) may be removed from the proximal portion (517) of the flexible body (516) or from another optional instrument port (not shown) along the flexible body (516).

In one or more embodiments, one or more actuators (506) may be used to drive the flexible catheter (502). For example, one actuator may be used to drive the catheter along the insertion degree of freedom of the flexible catheter. Additional actuators may be used to drive the catheter along one or more articulation degrees of freedom, as further discussed below. In one or more embodiments, the flexible body (516) houses pull-wires, linkages, or other steering controls (540) that extend between the actuators (506) and the distal portion (518) to controllably bend the distal portion (518) as shown, for example, by the broken dashed line depictions (519) of the distal portion (518). In one or more embodiments, at least four pull-wires (540), actuated by at least four actuators (506) are used to provide independent up-down steering to control a pitch of the distal portion (518) and left-right steering to control a yaw of the distal portion (518). Steerable elongate devices are described in detail in U.S. patent application Ser. No. 13/274,208 (filed Oct. 14, 2011) (disclosing "Catheter with Removable Vision Probe"), which is incorporated by reference herein in its entirety. More details on control mechanisms for control systems for controlling flexible catheters are provided in U.S. Patent Application No. 62/671,758 (disclosing "Control Mechanism of a Catheter Control System"), which is incorporated by reference herein in its entirety. In one or more embodiments, the actuators (506) may removably couple to the flexible catheter (502) via the instrument interface (504). The actuators (506) may be, for example, servo motors, hydraulic and/or pneumatic actuators, etc. Referring to FIG. 4, the actuators (506) may be housed in, for example, the control assembly (410b) of the instrument carriage (408).

Continuing with FIG. 5A, when an actuator applies torque, a capstan (not shown) attached to the drive shaft of the actuator may be rotated. The rotation may cause a further wrapping or unwrapping of the pull-wire (540) around the capstan, thereby actuating the pull-wire to steer the distal end portion (518) of the flexible catheter (502). Each pull-wire (540) may be driven by a separate actuator. Accordingly, the tension on each of the pull-wires (540) may be individually controlled.

Monitoring a rotation position (e.g., angle) and/or rotational velocity of the capstan or actuator may be used to provide an indication of how far the pull-wire (540) is being released or pulled. Thus, the rotation angle and/or rotational velocity of the capstan and/or the torque applied by the actuator to drive the capstan may provide useful feedback on the steering to be applied at the distal portion (518). Which way the distal portion (518) bends may depend upon the placement of the pull-wire (540) with respect to other pull-wires that are also contributing to steering. Actuator sensors (508) such as resolvers, encoders, potentiometers, and other mechanisms may be used to track the rotation and/or orientation of capstans and/or actuators. The motor currents of the actuators may also be used to calculate forces and/or torques being applied to the pull-wires (540).

When configured to operate as antagonists, pairs of actuators (506) (e.g., one pair of actuators for pitch control of the distal portion (518) and one pair of actuators for yaw control of the distal portion (518)), may be used to articulate the distal portion (518) and control a stiffness of the flexible body (516). Further, by maintaining a minimum level of tension on the pull-wires (540), slack in the pull-wires (540) may be avoided. Releasing or reducing the force in the pull-wires (540) of the flexible catheter (502) may cause a corresponding reduced stiffness or rigidity in the flexible catheter (502). Similarly, applying or increasing a pulling force on the pull-wires (540) of the flexible body (516) may cause an increase in stiffness or rigidity of the flexible catheter (502). For example, the material of the flexible body (516) may become stiffer with multiple steering pull-wires being pulled concurrently. The stiffness or rigidity of the flexible catheter (502) may be a closed-loop stiffness or rigidity controlled by the control system. Examples of a closed-loop catheter control system and methods are described, for example, in U.S. patent application Ser. No. 13/274,198 (filed Oct. 14, 2011) (disclosing "Catheters with Control Modes for Interchangeable Probes") which is incorporated by reference herein in its entirety.

In one or more embodiments, the computer-assisted medical system (500) may include a tracking unit (530) for determining the position, orientation, speed, velocity, pose, and/or shape of the distal portion (518) and/or of one or more segments (524) along the flexible body (516), using one or more sensors and/or imaging devices as described in further detail below. The tracking unit (530) may be implemented as hardware, firmware, software or a combination thereof. One or more aspects of the tracking unit may be performed by the processor(s) of the control system (112) in FIG. 1.

The tracking unit (530) may track the distal portion (518) and/or one or more of the segments (524) using an articulation sensor such as the shape sensor (522). The shape sensor (522) may include an optical fiber aligned with the flexible body (516) (e.g., provided within an interior channel (not shown) of the flexible body (516) or mounted externally). In one embodiment, the optical fiber has a diameter of approximately 200 µm. The diameter of the fiber may be larger or smaller, without departing from the disclosure. The optical fiber of the shape sensor (522) forms a fiber optic bend sensor for determining the shape of flexible body (516). Optical fibers including Fiber Bragg Gratings (FBGs) may be used to provide strain measurements in structures in one or more dimensions. Various systems and methods for monitoring the shape and relative position of an optical fiber in three dimensions are described in U.S. patent application Ser. No. 11/180,389 (filed Jul. 13, 2005) (disclosing "Fiber optic position and shape sensing device and method relating thereto"); U.S. patent application Ser. No. 12/047,056 (filed on Jul. 16, 2004) (disclosing "Fiber-optic shape and relative position sensing"); and U.S. Pat. No. 6,389,187 (filed on Jun. 17, 1998) (disclosing "Optical Fibre Bend Sensor"), which are all incorporated by reference herein in their entireties. Other suitable strain sensing techniques, such as Rayleigh scattering, Raman scattering, Brillouin scattering, and Fluorescence scattering may be employed, without departing from the disclosure. Alternatively, the shape of the elongate device may be determined using other techniques. For example, a history of the distal end pose of flexible body (516) may be used to reconstruct the shape of flexible body (516) over an interval of time.

Continuing with FIG. 5A, the tracking unit (530) may receive a raw signal from the shape sensor (522). The tracking unit (530), in one or more embodiments, processes the raw signal to obtain information about the shape of the flexible body (516). The obtained information may be for the shape of the distal portion (518) and/or for one or more segments (524) along the flexible body (516). The tracking unit (530), in combination with the shape sensor (522) may provide feedback on, for example, an articulation of the flexible catheter (502). The tracking unit may further be configured to detect abnormality of the shape sensor (522) and/or the tracking unit itself. For example, the tracking unit (530) may detect noise (such as vibrations) in the raw signal. The tracking unit (530) may further detect a poor raw signal associated with a contaminated or poorly fitted fiber optic connector to the shape sensor (522).

In some embodiments, the tracking unit (530) optionally and/or additionally tracks the distal portion (518) using a position sensor system (520). The position sensor system (520) may use any appropriate sensing technology or combination of sensing technologies, such as, for example, electromagnetic techniques. An electromagnetic (EM) sensor system may include one or more conductive coils that may be subjected to an externally generated electromagnetic field. Each coil of such an EM sensor system used to implement position sensor system (520) then produces an induced electrical signal having characteristics that depend on the position and orientation of the coil relative to the externally generated electromagnetic field. In some embodiments, the position sensor system (520) may be configured and positioned to measure six degrees of freedom, e.g., three position coordinates X, Y, Z and three orientation angles indicating pitch, yaw, and roll of a base point or five degrees of freedom, e.g., three position coordinates X, Y, Z and two orientation angles indicating pitch and yaw of a base point. Further description of a position sensor system is provided in U.S. Pat. No. 6,380,732 (filed Aug. 11, 1999) (disclosing "Six-Degree of Freedom Tracking System Having a Passive Transponder on the Object Being Tracked"), which is incorporated by reference herein in its entirety. The position sensor system (520) may be used as an articulation sensor. For example, a plurality of sensors (520), such as EM sensors, may be positioned along the flexible catheter 502 (e.g., at a plurality of segments 524), and articulation (e.g., shape) of the flexible catheter 502 may be determined based on detected positions of the sensors (520).

The information from the tracking unit (530) may be sent to a navigation system (532) where it may be combined with information from the visualization system (531) and/or the preoperatively obtained models to provide the physician or other operator with real-time position information. The real-time position information may be displayed on display system 110 of FIG. 1 for use in the control of the computer-assisted medical system (500). In some examples, the control system (112) of FIG. 1 may utilize the position information as feedback for positioning the computer-assisted medical system (500). Various systems for using fiber optic sensors to register and display a surgical instrument with surgical images are provided in U.S. patent application Ser. No. 13/107,562, filed May 13, 2011, disclosing, "Medical System Providing Dynamic Registration of a Model of an Anatomic Structure for Image-Guided Surgery," which is incorporated by reference herein in its entirety.

Figure 6:
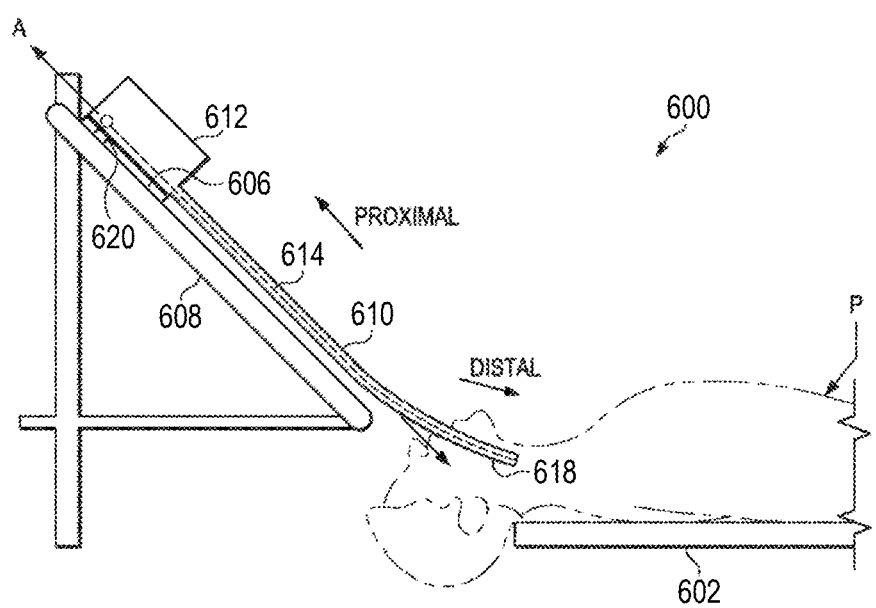
FIG. 6 shows a medical scenario, in accordance with one or more embodiments.

FIG. 6 schematically shows a medical scenario including a side view of a patient coordinate space, in accordance with one or more embodiments. The surgical scenario (600) may include a patient (P) positioned on a platform (602). The instrument carriage (606) is mounted to an insertion stage (608) as also shown in FIG. 4. The instrument carriage (606) may be used to control insertion/retraction of the flexible catheter (610) (e.g., motion along the insertion axis A) into/out of the anatomy of the patient (P), thereby establishing an insertion degree of freedom for the flexible catheter (610). The instrument carriage (606) may further be used to control motion (e.g., articulation) of the distal portion (618) of the flexible catheter in multiple directions including yaw and pitch. The instrument carriage (606) or insertion stage (608) may include an actuator, such as a servomotor, (not shown) that controls motion of the instrument carriage (606) along the insertion stage (608). Further, the instrument carriage (606) may include actuators that control the articulation of the distal portion (618) of the flexible catheter.

Figure 5:
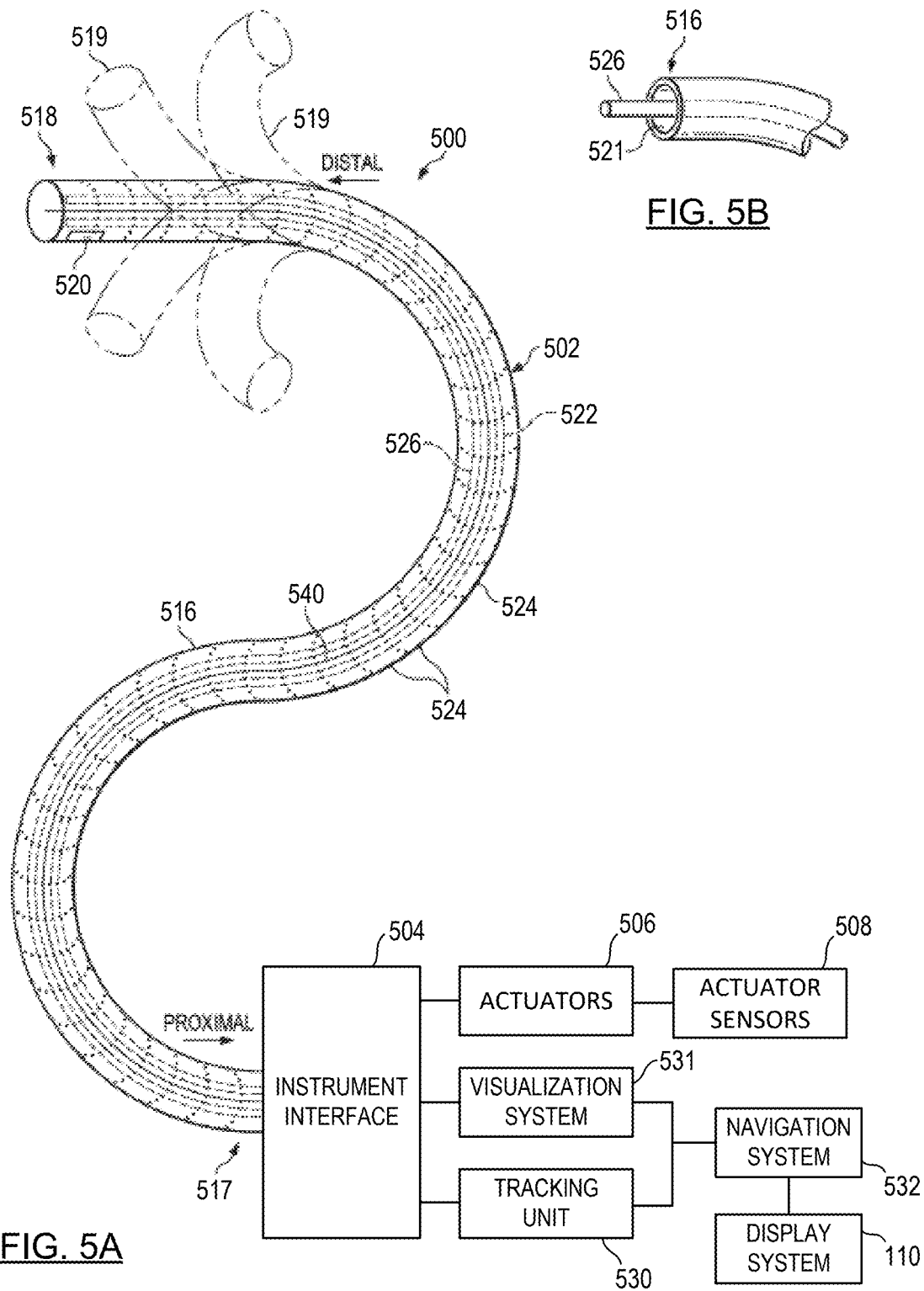
FIG. 5A and FIG. 5B schematically show examples of computer-assisted medical systems including flexible catheters, in accordance with one or more embodiments.

The flexible catheter (610) may be coupled to an instrument interface (612), previously described for FIGS. 4 and 5. The instrument interface (612) may be coupled and fixed relative to the instrument carriage (606). In one or more embodiments, an optical fiber shape sensor (614) provides information about the configuration of the flexible catheter (610), including, for example, position and/or orientation of the distal portion (618) of the catheter (610). A position measuring device (620) may provide information about the position of the instrument interface (612) as it moves on the insertion stage (608) along the retraction and/or insertion axis A (such as a direction along the longitudinal central axis of the instrument body) establishing the insertion degree of freedom of the flexible catheter (610). The position measuring device (620) may include resolvers, encoders, potentiometers, and/or other sensors that determine the rotation and orientation of drive shafts controlling the motion of the instrument carriage (606) and consequently the motion of the instrument interface (612). The insertion stage (608) may be linear, curved, or a combination thereof.

While FIG. 1, FIG. 2, FIG. 3, FIG. 4, FIG. 5A, FIG. 5B, and FIG. 6 show various configurations of components, other configurations may be used without departing from the scope of the disclosure. For example, various components may be combined to create a single component. As another example, the functionality performed by a single component may be performed by two or more components. Further, while the components are described in context of medical scenarios, embodiments of the disclosure may be equally applicable to other domains that involve robotic manipulation, e.g., non-medical scenarios or systems. Embodiments of the disclosure may be suitable for use in, for example, surgical, diagnostic, therapeutic, and/or biopsy procedures. While some embodiments are provided herein with respect to such procedures, any reference to medical or surgical instruments and medical or surgical methods is non-limiting. The systems, instruments, and methods described herein may be used for animals, human cadavers, animal cadavers, portions of human or animal anatomy, non-surgical diagnosis, as well as for industrial systems and general robotic or teleoperational systems. Rather than interacting with an anatomy of a patient or subject, the systems, instruments and methods may operate in or interact with a worksite of any type.

FIG. 7, FIG. 8, FIG. 9, and FIG. 10 show flowcharts in accordance with one or more embodiments. One or more of the operations in FIG. 7, FIG. 8, FIG. 9, and FIG. 10 may be performed by various components of the systems, previously described with reference to FIG. 1, FIG. 2, FIG. 3, FIG. 4, FIG. 5A, FIG. 5B, and FIG. 6. These figures describe particular manipulator assemblies and particular flexible catheters, the manipulator assemblies and flexible catheters having certain degrees of freedom. However, the subsequently described methods are not limited to a particular configuration of manipulator assemblies, flexible catheters and/or degrees of freedom. Instead, the methods are applicable to any type of flexible catheter supported by a manipulator assembly, used in any type of scenario.

While the various operations in these flowcharts are presented and described sequentially, one of ordinary skill will appreciate that some or all of the operations may be executed in different orders, may be combined or omitted, and some or all of the operations may be executed in parallel. Additional operations not shown in the flowcharts may also be performed. Furthermore, the operations may be performed actively or passively. For example, some operations may be performed using polling or be interrupt driven in accordance with one or more embodiments of the disclosure. By way of an example, determination operations might not require a processor to process an instruction unless an interrupt is received to signify that condition exists in accordance with one or more embodiments of the disclosure. As another example, determination operations may be performed by performing a test, such as checking a data value to test whether the value is consistent with the tested condition in accordance with one or more embodiments of the disclosure. Accordingly, the scope of the disclosure should not be considered limited to the specific arrangement of operations shown in FIG. 7, FIG. 8, FIG. 9, and FIG. 10.

The flowcharts of FIG. 7, FIG. 8, FIG. 9, and FIG. 10 describe methods for addressing abnormalities (e.g., temporary fault conditions), in accordance with one or more embodiments. A fault condition may introduce an error to a feedback signal obtained from a sensor that measures articulation of the flexible catheter. For example, a sensor signal of a shape sensor measuring the shape of the flexible catheter may become unavailable in presence of mechanical vibrations. Mechanical vibrations may be caused by, for example, the insertion or removal of a tool (e.g., a vision probe, a tool, a needle, a forceps, etc.). These tools may be more rigid than the flexible catheter and may excite some vibrations during the insertion/retraction. The fault condition may be temporary. For example, the fault condition may disappear once insertion or retraction of the tool has been completed or shortly thereafter. The error on the sensor signal, while present, may make the sensor signal unsuitable or less suitable for use as a feedback signal for closed-loop control. Accordingly, in the presence of an abnormality, the control method may rely on an alternate feedback signal. In one or more embodiments, the alternate feedback signal is an estimate of the actual articulation. The estimate of the actual articulation may be generated by a model of the flexible catheter based on a sensor signal representing movement of the actuator that drives articulation of the flexible catheter.

Figure 7:
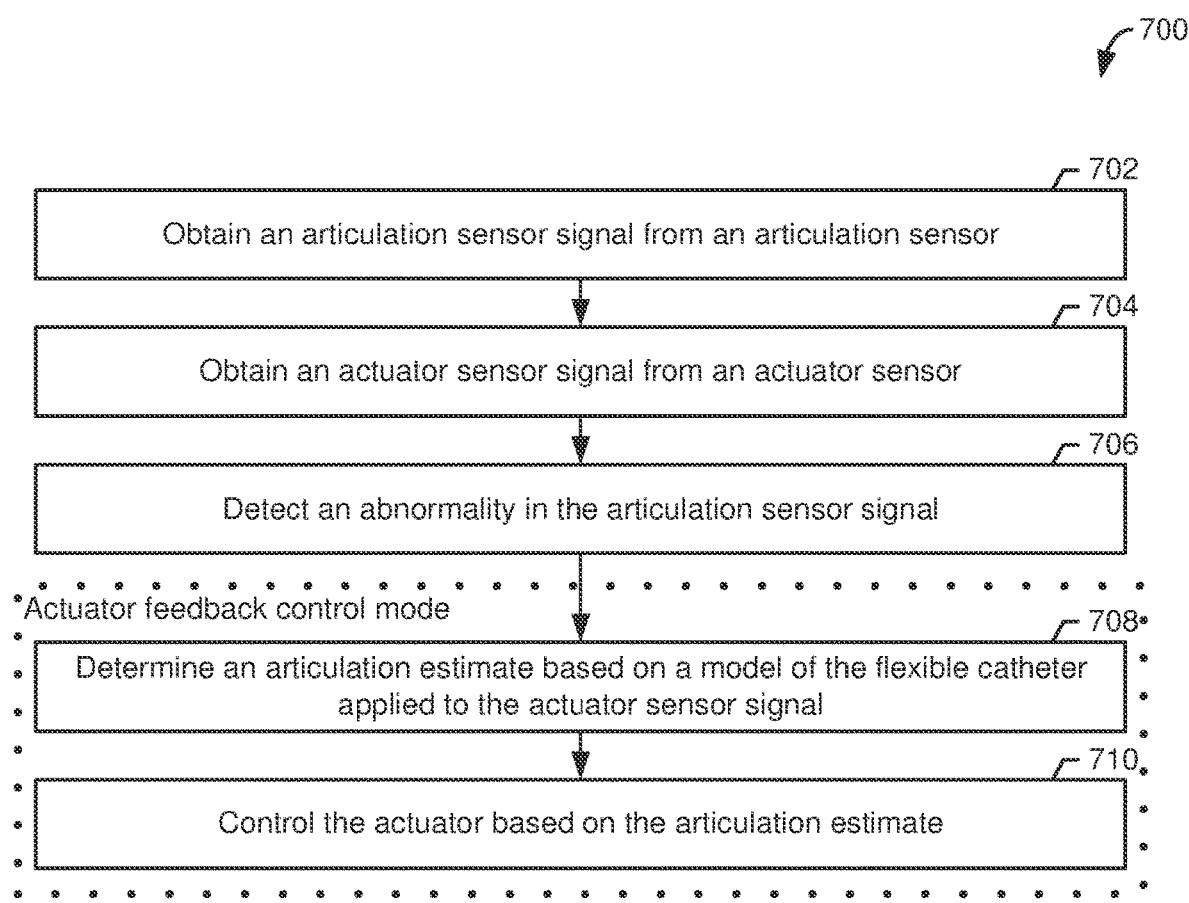
FIG. 7 shows an example method for controlling a flexible catheter of a computer-assisted medical system, in accordance with one or more embodiments.

The flowchart of FIG. 7 shows an example method (700) for controlling a flexible catheter, in accordance with one or more embodiments. The method may be used to control articulation of the flexible catheter. The articulation may be along one or more degrees of freedom (e.g., pitch and/or yaw). A single segment (e.g., an end segment) of the flexible catheter, multiple segments, or the entire flexible catheter may be articulated. For example, a distal portion (518) of the flexible catheter (502) shown in FIG. 5A may be articulated. The method (700) may be repeatedly executed to control the flexible catheter over time, e.g., based on a cycle time of the control loop implemented for controlling the articulation of the flexible catheter.

In operation 702, an articulation sensor signal is obtained from an articulation sensor. The articulation sensor signal may represent an articulation (e.g., shape) of at least a portion of the flexible catheter. As explained above, the articulation sensor may be any type of sensor suitable for measuring articulation of the catheter. The articulation sensor may sense along a single or multiple articulation degrees of freedom. The articulation sensor may sense articulation of one segment of the flexible catheter, multiple segments, or the entire flexible catheter. The sensor may be, for example, a shape sensor, as previous described. The articulation sensor signal may provide a value for the articulation, and the value may indicate an angle, position, orientation, speed, velocity, pose, and/or shape of one or more portions of the flexible catheter. The articulation sensor signal may be accompanied by one or more flags to label the articulation sensor signal. For example, the articulation sensor signal may be labeled as untrustworthy when the tracking unit (e.g., as described with reference to FIG. 5A) concludes that the raw sensor signal obtained from the articulation sensor is unreliable (e.g., based on the buffer holding only outdated raw articulation sensor signal values). The articulation sensor signal might provide no value when the raw sensor signal is deemed unreliable.

In operation 704, an actuator sensor signal is obtained from an actuator sensor. The actuator sensor signal may represent movement (e.g., position or rotation) of an actuator used to drive articulation of the flexible catheter (e.g., by pulling or releasing tension on a pull wire). As explained above, the actuator sensor may be any type of sensor suitable for measuring movement of the actuator that is driving the articulation. The actuator sensor may be, for example, an encoder (e.g., an incremental encoder) on the motor shaft of a servo motor. If multiple actuators are used for articulation along one or more degrees of freedom, the articulation sensor signal may include signals obtained from multiple encoders. Configurations for driving an articulation using one or more actuators were described with reference to FIG. 5A. The actuator sensor signal may provide one or more values representing the state of the actuator, for example an angle of the motor shaft. The actuator sensor signal may include position and/or velocity information.

Those skilled in the art will appreciate that the articulation sensor signal and the actuator sensor signal may include position and/or velocity information. A velocity signal may be obtained from a position signal through numerical differentiation. Similarly, a position signal may be obtained from a velocity signal through numerical integration.

In operation 706, a test may be performed to determine whether an abnormality is present in the articulation sensor signal. An abnormality may be any change in the articulation sensor signal that prevents or hinders the articulation sensor signal from being used as a feedback signal for controlling articulation of the flexible catheter. For example, the abnormality may be a degradation (e.g., noise) of the articulation sensor signal caused by a mechanical vibration. As explained above, mechanical vibration may occur during insertion or removal of a tool into or from the flexible catheter. The test may be performed by evaluating a flag associated with the articulation sensor signal. The flag, when used to indicate mechanical vibration, may be set after analyzing the articulation sensor signal, for example, for frequencies indicative of mechanical vibrations. In the example flowchart of FIG. 7, an abnormality in the articulation sensor is present, and the process may proceed to operation 708.

Operations 708 and 710 may be performed in an actuator feedback control mode. In the actuator feedback control mode, the actuator sensor signal may be used as a feedback signal for controlling articulation of the flexible catheter.

In operation 708, an articulation estimate is determined by applying a model of the flexible catheter to the actuator sensor signal. The model may be based on known characteristics (e.g., kinematics and/or dynamics) of the flexible catheter, enabling the articulation estimate to be determined based on the actuator sensor signal by simulation, when an actual measurement of the articulation by the articulation sensor is not available. The model that is used in operation 708 may have been previously determined, as will be described below with reference to FIG. 8. An example implementation of the model will be described below with reference to FIG. 11.

In operation 710, the actuator(s) used to articulate the flexible catheter may be controlled based on the articulation estimate. A feedback controller used to control the actuator(s) may use the articulation estimate as a feedback signal and may also accept a command input. The feedback controller may be configured to minimize an error between the command input and the feedback signal (here, the articulation estimate) to drive the actuator(s). As the actuator(s) is/are driven, the articulation of the flexible catheter (driven by the actuator(s)) may follow the command input.

Operations 708 and 710 may be repeatedly executed, such as in the presence of an abnormality. With each execution, an updated articulation estimate is determined (when executing operation 708).

Figure 8:
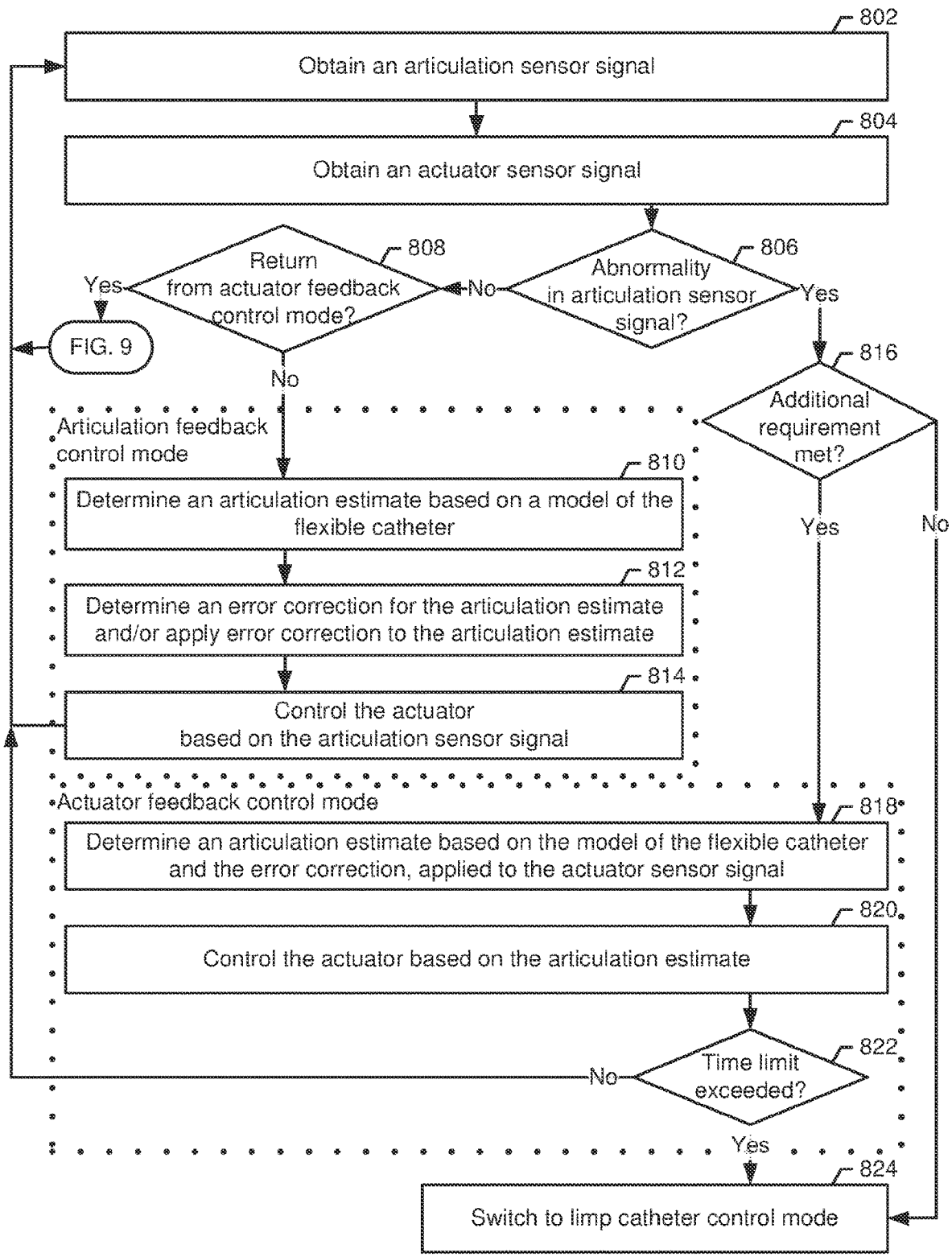
FIG. 8 shows an example method for controlling a flexible catheter of a computer-assisted medical system, in accordance with one or more embodiments.

The flowchart of FIG. 8 shows an example method (800) for controlling a flexible catheter, in accordance with one or more embodiments. For example, the method may be used for controlling articulation of the flexible catheter. The articulation may be along one or more articulation degrees of freedom. A single segment (e.g., an end segment) of the flexible catheter, multiple segments, or the entire flexible catheter may be articulated. For example, a distal portion of the flexible catheter may be articulated.

In operation 802, an articulation sensor signal is obtained from an articulation sensor. The articulation sensor signal may represent an articulation (e.g., shape) of at least a portion of the flexible catheter. As explained above, the articulation sensor may be any type of sensor suitable for measuring articulation of the catheter. The articulation sensor may sense along a single or multiple articulation degrees of freedom. The articulation sensor may sense articulation of one segment of the flexible catheter, multiple segments, or the entire flexible catheter. The sensor may be, for example, a shape sensor, as previous described. The articulation sensor signal may provide a value for the articulation and the value may indicate an angle, position, orientation, speed, velocity, pose, and/or shape of one or more portions of the flexible catheter. In some embodiments, the articulation sensor signal may be low-pass-filtered for smoothing of the articulation sensor signal. The low-pass filter may be a moving average filter. In addition to performing the filtering, the moving average filter may also serve as a buffer storing a history of articulation sensor values. When a raw articulation sensor signal value is defective, it might not enter the buffer. Instead, the last known good raw articulation sensor signal value may be held. Accordingly, the moving average filter may provide an articulation sensor signal even when one or a few raw articulation sensor signal values are defective. Once the buffer no longer holds valid raw articulation sensor signal values, the buffer may be considered depleted, and a flag may be set to indicate that the articulation sensor signal is no longer valid. The articulation sensor signal may, thus, be accompanied by one or more flags to label the articulation sensor signal. For example, the articulation sensor signal may be labeled as untrustworthy when the tracking unit (e.g., as described with reference to FIG. 5A) concludes that the raw sensor signal obtained from the articulation sensor is unreliable (e.g., based on the buffer holding outdated raw articulation sensor signal values). The articulation sensor signal might provide no value when the raw sensor signal is deemed unreliable.

In operation 804, an actuator sensor signal is obtained from an actuator sensor. The actuator sensor signal may represent movement (e.g., position or rotation) of an actuator used to drive articulation of the flexible catheter (e.g., by pulling or releasing tension on a pull wire). As explained above, the actuator sensor may be any type of sensor suitable for measuring the movement of the actuator that is driving the articulation. The actuator sensor may be, for example, an encoder (e.g., an incremental encoder) on the motor shaft of a servo motor. If multiple actuators are used for articulation along one or more degrees of freedom, the articulation sensor signal may include signals obtained from multiple encoders. Configurations for driving an articulation using one or more actuators were described with reference to FIG. 5A. The actuator sensor signal may provide one or more values representing the state of the actuator, for example an angle of the motor shaft. The actuator sensor signal may include position and/or velocity information.

Those skilled in the art will appreciate that the articulation sensor signal and the actuator sensor signal may include position and/or velocity information. A velocity signal may be obtained from a position signal through numerical differentiation. Similarly, a position signal may be obtained from a velocity signal through numerical integration.

In operation 806, a test may be performed to determine whether an abnormality is present in the articulation sensor signal. An abnormality may be any change in the articulation sensor signal that prevents or hinders the articulation sensor signal from being used as a feedback signal for controlling articulation of the flexible catheter. For example, the abnormality may be a degradation (e.g., noise) of the articulation sensor signal caused by a mechanical vibration. As explained above, mechanical vibration may occur during insertion or removal of a tool into or from the flexible catheter. The test may be performed by evaluating a flag associated with the articulation sensor signal. If the flag indicates that the articulation sensor signal is normal (e.g., uncompromised), the method may proceed to operation 808. If the flag indicates that the articulation sensor signal is abnormal (e.g, compromised, such as by mechanical vibrations), the method may proceed to operation 816.

In operation 808, a test may be performed to determine whether the system is returning from the actuator feedback control mode to the articulation feedback control mode. The actuator feedback control made may be used when an articulation sensor signal is not available as a feedback signal for controlling articulation of the flexible catheter. The articulation feedback control mode may be used when an articulation sensor signal is available as a feedback signal for controlling articulation of the flexible catheter. In accordance with one or more embodiments, operation 808 may be performed to enable a controlled transition back to regular operation of the system when the articulation sensor signal returns. The determination in operation 808 may be made, for example, by examining a flag that indicates whether the system was previously operating in the actuator feedback control mode or not. If the flag indicates that the system is returning from the actuator feedback control mode (808: Y), one or more of the operations shown in the example method of FIG. 9 may be executed. If the flag indicates that the system is not returning from the actuator feedback (e.g., indicating continued operation in the articulation feedback control mode), the method may proceed to operation 810.

Operations 810 and 812 may be performed in an articulation feedback control mode. In the articulation feedback control mode, the articulation sensor signal may be used as a feedback signal for controlling articulation of the flexible catheter.

In operation 810, an articulation estimate may be determined based on a model of the flexible catheter. For example, under regular operating conditions (e.g., while no abnormality is detected), the articulation estimate may be computed at regular time intervals, e.g., based on a cycle time of the control loop implemented for controlling articulation of the flexible catheter. The articulation estimate may be produced by the model operating on the actuator sensor signal. The model (e.g., a simulation model) may establish a mathematical relationship between a state of the actuator (e.g., rotation position and/or velocity) and a state of the flexible catheter in one or more articulation degrees of freedom (e.g., an articulation which may be expressed as an angle and/or a rate of change of the articulation which may be expressed as an angular velocity). Accordingly, the model may be used to predict a current state of the flexible catheter in one or more articulation degrees of freedom based on the current state of the actuator, as represented by the actuator sensor signal. States that are processed by the model may include positions, velocities, and/or accelerations.

In operation 812, an error correction for the articulation estimate may be determined, and/or the error correction may be applied to the articulation estimate. The error-corrected articulation estimate may correspond to (e.g., match) an actual articulation of the flexible catheter, as measured by the articulation sensor. In some scenarios, the articulation estimate determined in operation 810 may be inaccurate because the simulation model might not always accurately reflect the mechanical configuration of the flexible catheter. The error correction may be determined based on a comparison of the articulation estimate and the actual articulation (e.g., shape) of the flexible catheter, as represented by the articulation sensor signal. For example, the error correction may be determined by subtracting the articulation estimate from the actual articulation represented by the articulation sensor signal. To compensate for possible inaccuracy of the articulation estimate, the error correction may then be applied to the articulation estimate to achieve a result more closely resembling the articulation sensor signal. Prior to applying the error correction to the articulation estimate, the error correction may be low-pass-filtered. The low pass filtering may facilitate smoother transitions between the different control modes of the system, as illustrated in the performance data of FIG. 12, below. After the error correction, the articulation estimate (e.g., determined in operation 810) may correspond to (e.g., match) the actual articulation, as represented by the articulation sensor signal. Because operation 810 may be repeatedly executed when no abnormality is present, the error-corrected articulation estimate may track the actual articulation over time.

An example implementation of a simulation model and the error correction is provided below with reference to FIG. 11. Further, identification and configuration of the simulation model is described below with reference to FIG. 10.

In operation 814, the actuator(s) used to articulate the flexible catheter may be controlled based on the articulation sensor signal. In one or more embodiments, a feedback controller (e.g. servo controller) as initially described with reference to FIG. 1 may be used to control articulation. The feedback controller may rely on feedback from the articulation sensor and may accept a command input. The command input may be provided by a user commanding an articulation and/or by an algorithm involved in controlling articulation of the flexible catheter. The commanded input may include a commanded articulation position and/or a commanded articulation velocity.

Returning to operation 806, if an abnormality is present in an articulation sensor signal (806: Y), the method may optionally proceed to operation 816. In operation 816, a test may be performed to determine whether additional requirements are met to allow the system to operate in an actuator feedback control mode, as described below. An additional requirement may be, for example, that the flexible catheter is in a position hold mode. In the position hold mode, articulation may be held constant. A user command during the position hold mode might not cause the flexible catheter to articulate. For example, the system may rejection user commands during the position hold mode. The absence of movement in the articulation degree(s) of freedom may make it more likely that the mapping from actuator motion to articulation movement remains constant, thus keeping the simulation model valid. Alternatively, the system may permit movement commands of limited amplitude and/or velocity during the position hold mode. If additional requirement(s) are met (816: Y), the method may proceed by entering the actuator feedback control mode. If the additional requirement(s) are not met (816: N), the method may proceed to operation 824 to switch the system to a limp catheter control mode, as will be described in further detail below.

One or more of operations 818, 820, or 822 may be performed in the actuator feedback control mode. In the actuator feedback control mode, the articulation sensor signal might not available as a feedback signal for controlling articulation of the flexible catheter. An articulation estimate generated based on a model of the flexible catheter may instead be used.

In operation 818, an articulation estimate is determined by applying the model of the flexible catheter to the actuator sensor signal. The model that is used in operation 818 may be the model that is determined when operating in the articulation feedback control mode, as previously explained. In some examples, the model may include an error correction. For example, an error correction used in operation 818 may be the most recent error correction determined (e.g., by performing operation 812) before the abnormality appeared. An example of operation 818 will be described below with reference to FIG. 11.

In operation 820, the actuator(s) used to articulate the flexible catheter may be controlled based on the articulation estimate. A feedback controller used to control the actuator(s) may use the articulation estimate as a feedback signal and may also accept a command input. The feedback controller may be configured to minimize an error between the command input and the feedback signal (here, the articulation estimate) to drive the actuator(s). As the actuator(s) is/are driven, the articulation of the flexible catheter (driven by the actuator(s)) may follow the command input.

Operations 818 and 820 may be repeatedly executed, such as in the presence of the abnormality. With each execution, an updated articulation estimate is determined (when executing operation 818).

In operation 822, a test is performed to determine whether a time limit is exceeded. The time limit may govern how long the system operates in the actuator feedback control mode. Over time the articulation estimate may get increasingly inaccurate when no actual feedback from the articulation sensor is available to error-correct the articulation estimate. The time limit may be specified such that the system may continue to operate in the actuator feedback control mode for a limited time only. The time limit may comprise a predetermined time limit. The time limit may be set based on the mechanical characterisitics of the flexible catheter, based on the control algorithms being used, etc. These factors may affect how rapidly the flexible catheter diverges from the estimated articulation. Further, use conditions may also affect the choice of the time limit. In a completely stationary environment, it may be unlikely for the flexible catheter to diverge from the estimated articulation, whereas in an environment that involves motion, a divergence may occur relatively quickly. The time limit may be chosen so that the likelihood of unstable and/or unwanted motions are minimized. For example, the time limit may be set such that an error that may develop during limited time is deemed acceptable. If the time limit has not been exceeded (822: N), the method may proceed to operation 802, as previously described. If the time limit has been exceeded (822: Y), the method may proceed to operation 824.

In operation 824, the system may be switched to operate in a limp catheter control mode. In the limp catheter control mode, the flexible catheter may be relaxed along the articulation degree(s) of freedom. When entering the limp catheter control mode, the actuator(s) may be controlled to gradually reduce the tension on the pull wires used for actuating the catheter along the articulation degree(s) of freedom. A specified minimum tension may may be maintained. In the limp catheter control mode, the flexible catheter may be backdriveable along the articulation degree(s) of freedom. When the flexible catheter is backdriveable, an external force acting on the flexible catheter may cause articulation. Relatively small forces may be sufficient to cause backdriving.

In the method (800), a system may temporarily operate in an actuator feedback control mode, such as when vibrations caused by an insertion of an instrument into the flexible catheter temporarily corrupt articulation sensor signals. While the operation in the actuator feedback control mode may be time-limited, the available time may be sufficient to bridge a time-span between when an articulation sensor signal is unavailable and when an articulation sensor signal becomes available. After the articulation sensor signal becomes available (e.g., is no longer corrupted), the system may return to operate in the articulation feedback control mode. Additional aspects of the transition between articulation feedback control mode and actuator feedback control mode are described below, with reference to the example implementation shown in FIG. 10.

Figure 9:
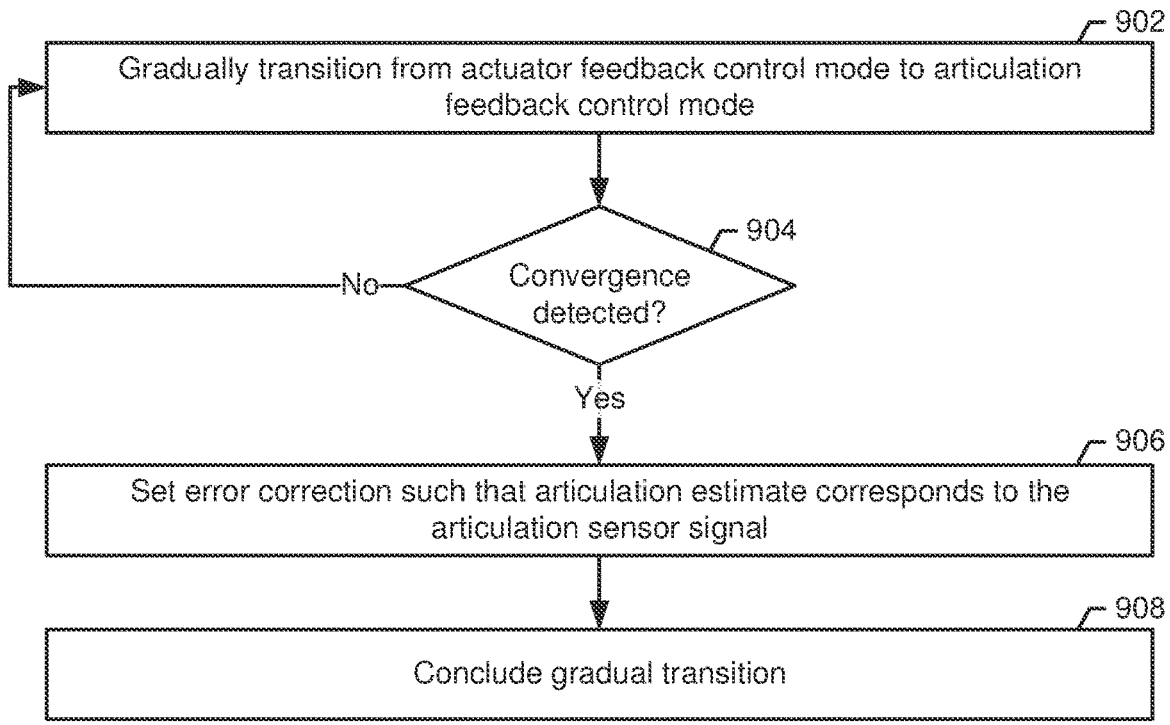
FIG. 9 shows an example method for controlling a flexible catheter of a computer-assisted medical system, in accordance with one or more embodiments.

The flowchart of FIG. 9 shows an example method (900) for controlling a flexible catheter, in accordance with one or more embodiments. The method may be used for controlling articulation of the flexible catheter during a transition from the actuator feedback control mode to the articulation feedback control mode. As previously explained, one or more of the operations shown in FIG. 9 may be performed after the system determines to return to the articulation feedback control mode from the actuator feedback control mode (e.g., as determined in operation 808 of FIG. 8). The example method (900) may be used for a smooth transition between modes and may be used when the articulation estimate deviates from the actual articulation reflected by articulation sensor signals. A hard switch could result in an undesired abrupt movement of the flexible catheter, which may be avoided by a smooth transition.

In operation 902, a gradual transition from the actuator feedback control mode to the articulation feedback control mode is performed. In this hybrid operating mode, both the articulation feedback control mode and the actuator feedback control mode are active. To control the actuator, a stepped interpolation between controlling the actuator based on the articulation sensor signal (e.g., as described in operation 814) and controlling the actuator based on the articulation estimate (e.g., as described in operation 820) may be performed. Initially, the control may be substantially based on the articulation estimate (e.g., completely based on the articulation estimate). Over multiple iterations of executing operation 902, resulting from repeated execution of the method (900), control may be increasingly based on articulation sensor signals, e.g., until the control is substantially based on articulation sensor signals (e.g., completely based on articulation sensor signals). The rate at which the transition occurs may be configurable.

The execution of operation 902 is optional. Even without the execution of operation 902, the system could perform a gradual transition from the actuator feedback control mode to the articulation feedback control mode. Assume that, as previously described, the error correction (e.g., as determined in operation 812) is low-pass-filtered. When updating the articulation estimate, the articulation estimate may gradually, governed by the time constant of the low pass filter, approach the articulation sensor signal. Accordingly, the articulation estimate may be used to control the actuator until the articulation estimate has converged to the articulation sensor signal. By then, the control may switch to directly using the articulation sensor signal while achieving a smooth transition.

When using the transition scheme as described in operation 902, additional control over the transition from actuator feedback control mode to articulation feedback control mode may become available, e.g., the progression of the transition might no longer be governed by the time constant of the low pass filter. Other methods for transitioning between prediction-based and sensor-based signals, such as a Kalman filter, as briefly discussed below, may be used.

In operation 904, a test is performed to determine whether a convergence of the articulation estimate to the articulation sensor signal is reached. If the convergence is not reached, operation 902 may be repeated with the next execution of the method (900). If the convergence is reached, the method may proceed to operation 906.

In operation 906, after convergence of the articulation estimate to the articulation sensor signal, the error correction may be set such that the articulation estimate corresponds to (e.g., matches) the articulation sensor signal. Operation 906 may be beneficial when the transition performed in operation 902 progresses at a faster rate than the time constant of the low pass filter would allow. In this case, to ensure that the error correction is accurate and allow an immediate switch back to the actuator feedback control mode if necessary, using operation 904, the error correction may be set rather than waiting for its gradual convergence.

In operation 908, the gradual transition may be concluded. Accordingly, once operation 908 is reached, during the next execution of operation 808 of the method (800), the system may switch to operating in the articulation feedback control mode (808: N).

Figure 10:
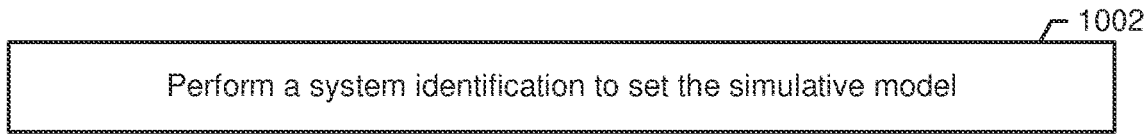
FIG. 10 shows an example method for performing a system identification to obtain a model for controlling a flexible catheter of a computer-assisted medical system, in accordance with one or more embodiments.

The flowchart of FIG. 10 shows an example method for performing a system identification to set the simulation model. The method may be executed prior to the execution of the methods of FIG. 7, FIG. 8, and FIG. 9. The method may be executed as part of a system and/or flexible catheter initialization, calibration or re-calibration.

In operation 1002, a system identification is performed. The system identification may involve determining a relationship between movement by actuator(s) as measured by actuator sensor(s) and resulting articulation movements by the flexible catheter as measured by the articulation sensor. The system identification may be performed under known motion conditions. For example, a pattern of specific calibration movements may be commanded to the actuator. The system identification may be part of a catheter test sequence which may be performed during or after the manufacturing or assembly of the system and/or the flexible catheter, upon system startup, after installation of the flexible catheter on the system, and/or prior to insertion of the flexible catheter into the patient, etc. Examples of catheter calibration and test sequences are provided in PCT Patent Application No. PCT/US2019/053928 (published as WO2020/072398, priority to U.S. Patent Application No. 62/741,242 (filed Oct. 4, 2018 and titled "Systems and Methods for Device Verification and Sensor Calibration")), which is incorporated by reference herein in its entirety.

The simulation model described herein may comprise a matrix (e.g., a coupling matrix) that establishes a relationship between actuator angles and articulation angles. A gain of the coupling matrix may establish how a particular actuator angle affects a particular articulation angle. Consider, for example, a flexible catheter having pitch and yaw articulation degrees of freedom. Further, assume that two pairs of antagonistically operating actuators drive the flexible catheter in the pitch and yaw articulation degrees of freedom. Accordingly, the coupling matrix may include a total of eight gains to couple actuator movement to articulation movement. The magnitude of the gains may depend on the mechanical design of the flexible catheter. For example, the gains for pitch and yaw degrees may be orthogonal. As another example, the gains may be isotropic for the pitch and yaw degrees of freedom. Alternatively, the gains may be anisotropic, such as if the pitch and yaw degrees of freedom are not mechanically symmetric. Further, a cross-coupling between the pitch and yaw degrees of freedom may exist. These factors would be represented by the coupling matrix, as obtained during the system identification. The coupling matrix may be static, e.g., the gains may be held constant after completion of the system identification.

Other simulation models, which may be more complex, may be used without departing from the disclosure. For example, a model that considers system dynamics, including compliance and friction may be used.

Figure 11:
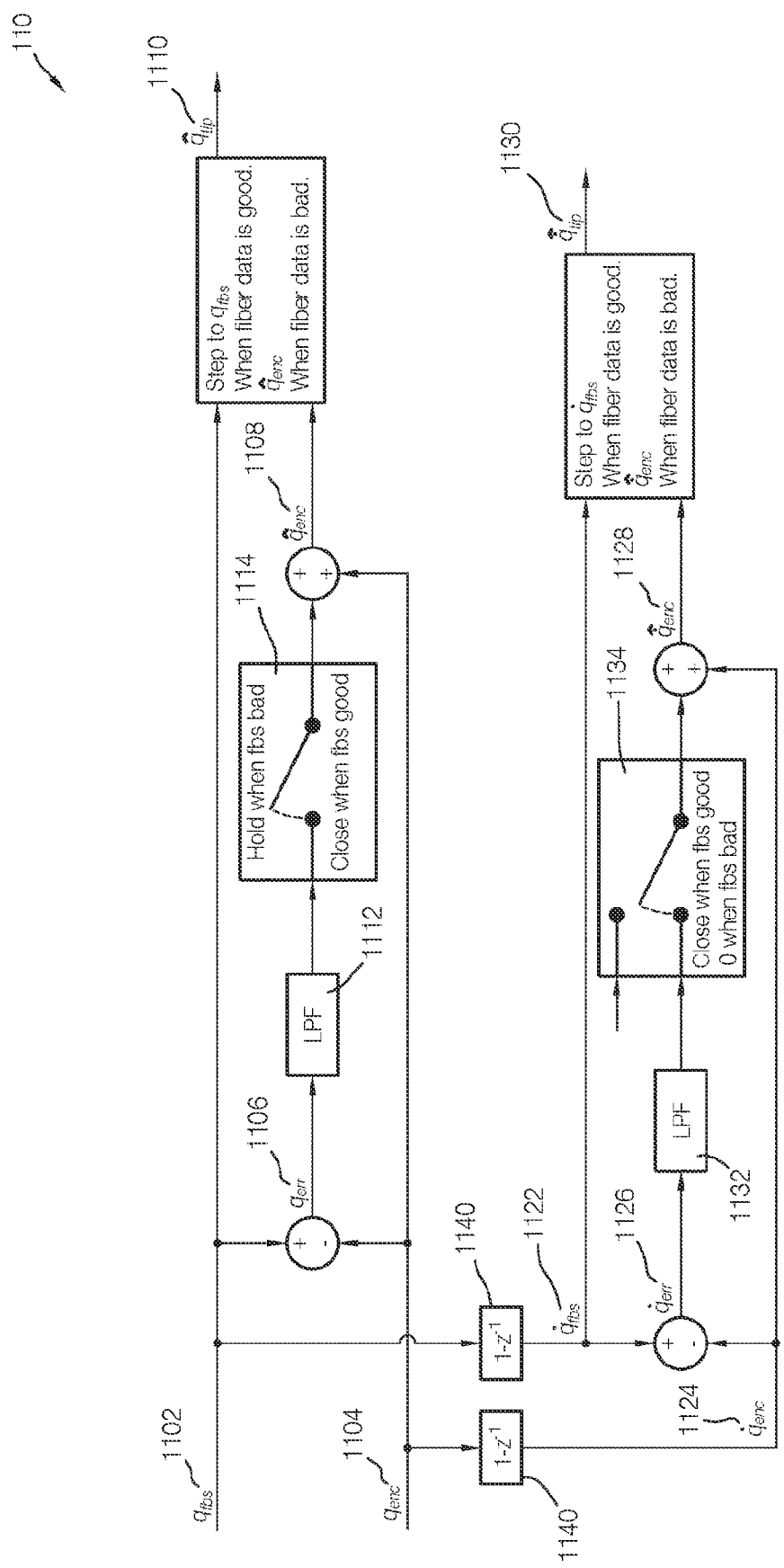
FIG. 11 shows an implementation example, in accordance with one or more embodiments.
Figure 12:
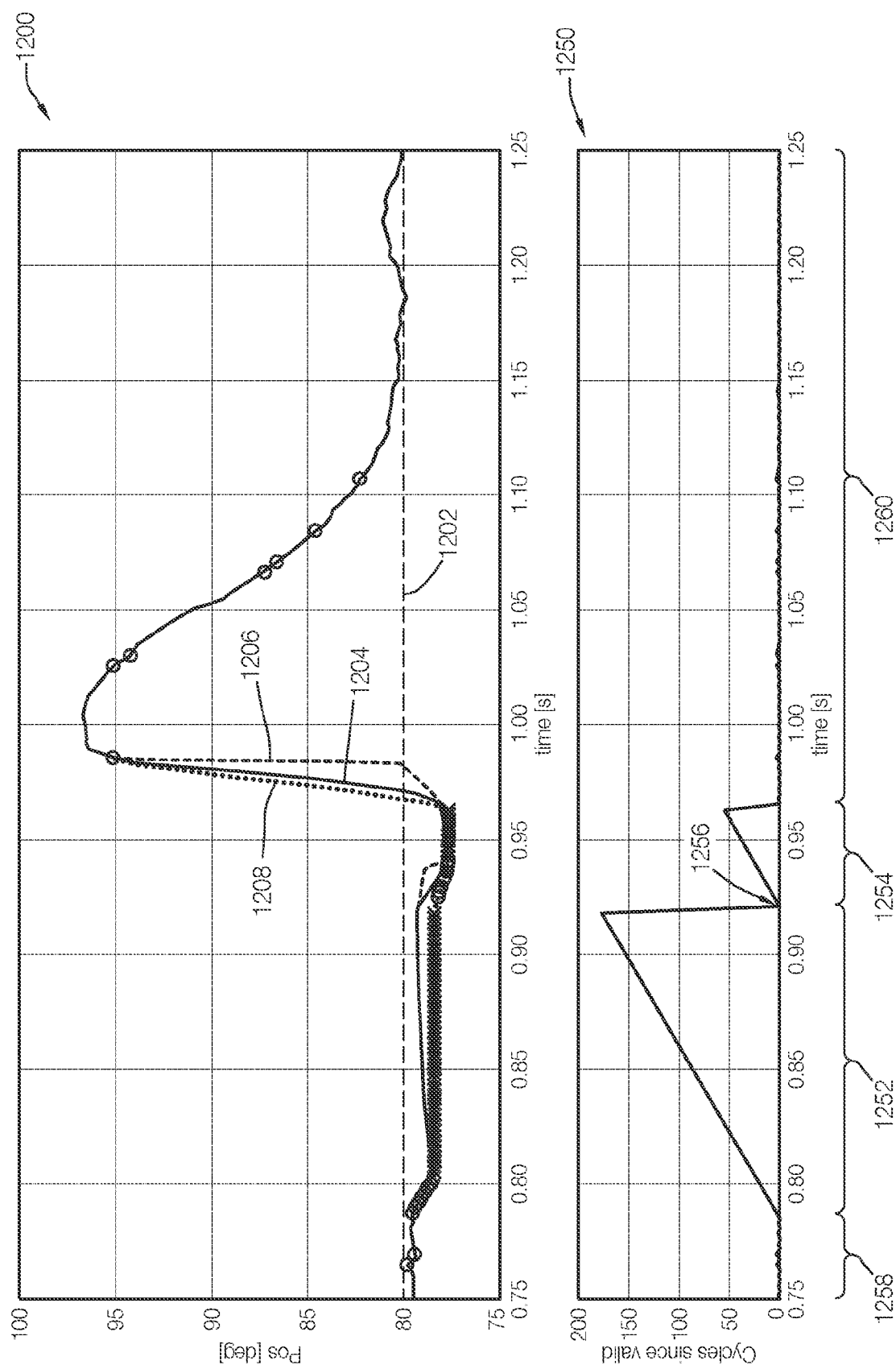
FIG. 12 provides examples for the performance of embodiments of the disclosure.

FIG. 11 shows an implementation example, in accordance with one or more embodiments. In the example, a position of the flexible catheter along the articulation degree of freedom, $q_{fbs}$ (1102), and a position of the driving actuator, $q_{enc}$ (1104), are shown as inputs. $q_{fbs}$ (1102) may be obtained from an articulation sensor (e.g., an optical fiber shape sensor) and may be low-pass filtered (e.g., using a moving average filter). $q_{enc}$ (1104) may be obtained from a position sensor (e.g., an encoder) of the actuator driving the flexible catheter along the articulation degree of freedom. Assume that $q_{enc}$ (1104) is processed through a simulation model (e.g., multiplication by an appropriate gain) such that $q_{fbs}$ (1102) and $q_{enc}$ (1104) can be directly compared. An error, $q_{err}$ (1106) may be obtained by subtracting $q_{enc}$ (1104) from $q_{fbs}$ (1102). A low-pass filter (LPF) operation (1112) may be performed on $q_{err}$ (1106). When no abnormality is detected (e.g., $q_{fbs}$ (1102) good), the system may be in the articulation feedback control mode previously described in FIG. 8. An articulation estimate $\hat{q}_{enc}$ (1108) may be obtained by adding $q_{err}$ (which may be low-pass filtered (1112) and passed through switch (1114)) to $q_{enc}$ (1104). Further, $q_{fbs}$ (1102) may be used as the output, $\hat{q}_{tip}$ (1110), for feedback control of the articulation. In the presence of an abnormality (e.g., $q_{fbs}$ (1102) bad), the system may be in the actuator feedback control mode previously described in FIG. 8. An articulation estimate $\hat{q}_{enc}$ (1108) may be obtained by adding the last successfully obtained $q_{err}$ (switch (1114) in the open position to hold the last successfully obtained $q_{err}$) to $q_{enc}$ (1104). $\hat{q}_{enc}$ (1108) may be used as the output, $\hat{q}_{tip}$ (1110), for feedback control of the articulation. Switching from the articulation feedback control mode to the actuator feedback control mode (e.g., when an abnormality in the articulation sensor is detected) may be instantaneous in some examples. In contrast, switching from the actuator feedback control mode to the articulation feedback control mode (e.g., after recovery from the abnormality) may be incremental in some examples, as described in FIG. 9. Accordingly, when switching from the actuator feedback control mode to the articulation feedback control mode, $\hat{q}_{tip}$ (1110) may temporarily be governed by a combination of $\hat{q}_{enc}$ (1108) and $q_{fbs}$ (1102). This behavior is illustrated in FIG. 12.

In the implementation example of FIG. 11, similar operations may be performed in the velocity domain. The operations in the velocity domain may be performed in addition to the operations in the position domain when control algorithms, e.g., a proportional-derivative (PD) controllers for driving the actuators use both position and velocity information. $\dot{q}_{fbs}$ (1122) and $\dot{q}_{enc}$ (1124) may be obtained from $q_{fbs}$ (1102) and $q_{enc}$ (1104), respectively, by numerical differentiation (1140). An error, $\dot{q}_{err}$(1126) may be obtained by subtracting $\dot{q}_{enc}$ (1124) from $\dot{q}_{fbs}$ (1122). A low-pass filter (LPF) operation (1132) may be performed on $\dot{q}_{err}$(1126). When no abnormality is detected (e.g., $q_{fbs}$ (1102) good), the system may be in the articulation feedback control mode previously described in FIG. 8. An articulation estimate $\hat{\dot{q}}_{enc}$ (1128) may be obtained by adding $\dot{q}_{err}$ (which may be low-pass filtered (1132) and passed through switch (1134)) to $\dot{q}_{enc}$ (1124). Further, $\dot{q}_{fbs}$ (1122) may be used as the output, $\hat{\dot{q}}_{tip}$ (1130), for feedback control of the articulation. In the presence of an abnormality (e.g., $\dot{q}_{fbs}$ (1122) bad), the system may be in the actuator feedback control mode previously described in FIG. 8. An articulation estimate $\hat{\dot{q}}_{enc}$ (1128) may be obtained by setting $\hat{\dot{q}}_{err}$ to zero (switch (1134) connecting to zero input). $\hat{q}_{enc}$ (1108) may be used as the output, $\hat{q}_{tip}$ (1110), for feedback control of the articulation.

In the implementation example of FIG. 11, $q_{err}$ may be continuously computed when in the articulation feedback control mode, and a smooth transition to/from the actuator feedback control mode may be possible. For example, when the relationship between $q_{fbs}$ and $q_{enc}$ changes, $q_{err}$ may capture the change in the relationship such that $\hat{q}_{enc}$ accurately tracks $q_{fbs}$, despite the change in the relationship between $q_{fbs}$ and $q_{enc}$. The relationship between $q_{fbs}$ and $q_{enc}$ may change, for example, when a segment of the flexible catheter, proximal to the articulation site changes its configuration (e.g., due to a bending of the catheter). In this case, the length of the pull wires from the various actuators' changes, thereby altering the relationship between $q_{fbs}$ and $q_{enc}$. A change in the stiffness of the catheter may also alter the relationship as a result of a slight catheter length change associated with the change in stiffness.

As an alternative to the implementation shown in FIG. 11, a non-linear state estimator may be used to estimate the catheter articulation. For example, a Kalman filter (e.g., an extended Kalman filter) that accounts for full system dynamics (including, for example, friction, inertia and/or compliance) and sensor noise characteristics, as well as non-linearities stemming from quantization and sampling effects, may be used to provide a more accurate estimate of the articulation state, including the tension of the individual pull wires and the actual articulation angle. The extended Kalman filter implementation may replace the implementation shown in FIG. 11, and Kalman filter gains may coordinate the smooth transition between using the articulation sensor signal and using the articulation estimate, without requiring a dedicated switching instance.

FIG. 12 shows plots (1200, 1250) showing the performance of an implementation as described in FIG. 11 when a flexible catheter is operated under realistic conditions. The upper panel plot (1200) shows various variables associated with catheter movement, whereas the lower panel plot (1250) shows cycle counts of invalid articulation sensor signals since a valid articulation sensor signal. The plots (1200, 1250) are aligned in time. Turning to the lower panel plot (1250), two prolonged time intervals with invalid articulation sensor signals (1252, 1254) are shown. The two time intervals are shown as interrupted by a very brief moment (1256) with valid articulation sensor data. Additional time intervals with valid articulation sensor signals (1258, 1260) are shown prior to and after the time intervals (1252, 1254). The invalid sensor signal may have been a result of vibrations, as previously discussed. Turning to the upper panel plot (1200), the articulation sensor signal, $q_{fbs}$, is plotted using a black dotted line. Points in time at which no valid articulation sensor signal was collected are indicated using the "x" or "o" symbol. The combination of "x" and "o" symbols represents cycles with an invalid articulation sensor signal as plotted in the lower panel plot (1250). There is a distinction between invalid articulation sensor signals that are plotted using the "x" symbol and invalid articulation sensor signals that are plotted using the "o" symbol. Specifically, while no valid sample was obtained at points in time indicated using the "o" symbol, a buffer configured to store a history of articulation sensor signal values may be used to provide a value for the articulation sensor signal. Accordingly, at any point in time at which the "o" symbol indicates a missing sample, the controller may continue to operate normally, based on buffered articulation sensor signals. Once the buffer is depleted (e.g., indicated using the "x" symbols), the controller may switch to operating in the actuator feedback control mode.

In the example shown in the upper panel plot (1200), the command input may be a commanded position held constantly at 80° (gray dashed line, 1202). The solid black line (1204) represents the output $\hat{q}_{tip}$ of an algorithm used for feedback control of the articulation. The black dashed line (1206) represents the articulation estimate, $\hat{q}_{enc}$. The black dotted line (1208) represents the articulation sensor signals. When no articulation sensor signals are available (e.g., "x"

symbols), the system may be in actuator feedback control mode. Accordingly, the signal $\hat{q}_{tip}$ used for feedback to the controller may follow the articulation estimate, $\hat{q}_{enc}$. Further, when articulation sensor signals are available, the signal $\hat{q}_{tip}$ used for feedback to the controller may follow the articulation sensor signal, $q_{fbs}$. As previously explained, switching from actuator feedback control mode to articulation feedback control mode may occur during a transition period. During the transition period, the signal $\hat{q}_{tip}$ used for feedback to the controller may smoothly converge toward the articulation sensor signal, $q_{fbs}$. After convergence is reached, the articulation estimate, $\hat{q}_{enc}$, may be set to match the articulation sensor signal $q_{fbs}$ (e.g., in one step), as previously described with reference to FIG. 9.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the claims.

What is claimed is:

1. A computer-assisted medical system, comprising:
    a flexible catheter configured to articulate along a degree of freedom;
    an actuator disposed at a proximal portion of the flexible catheter, wherein the actuator is configured to actuate the flexible catheter along the degree of freedom;
    an articulation sensor configured to provide articulation sensor signals representing articulation of the flexible catheter;
    an actuator sensor configured to provide actuator sensor signals representing movement of the actuator; and
    a controller coupled to the actuator and configured to, based on detecting an abnormality in a first articulation sensor signal:
        temporarily switching from:
            using the articulation sensor signals to control the actuator
        to:
            determining an articulation estimate of the flexible catheter, based on a relationship between the movement of the actuator and the articulation of the flexible catheter caused by the movement of the actuator, applied to a first actuator sensor signal obtained from the actuator sensor; and
            controlling the actuator based on the articulation estimate.

2. The computer-assisted medical system of claim 1, wherein the controller is further configured to, based on not detecting an abnormality:
    determine a second articulation estimate of the flexible catheter based on the relationship between the movement of the actuator and the articulation of the flexible catheter caused by the movement of the actuator, applied to a second actuator sensor signal;
    determine an error correction based on a difference between the second articulation estimate and an actual articulation of the flexible catheter, wherein the actual articulation is based on a second articulation sensor signal; and
    control the actuator based on the second articulation sensor signal.

3. The computer-assisted medical system of claim 2, wherein determining the second articulation estimate comprises adjusting the second articulation estimate based on the error correction.

4. The computer-assisted medical system of claim 2, wherein the controller is further configured to apply a low-pass-filter to the error correction.

5. The computer-assisted medical system of claim 1, wherein the controller is further configured to, before determining the articulation estimate, determine whether a requirement is met.

6. The computer-assisted medical system of claim 5, wherein determining whether the requirement is met comprises determining that the computer-assisted medical system is in a position hold mode.

7. The computer-assisted medical system of claim 5, wherein the controller is further configured to, when the requirement is not met, relax the flexible catheter along the degree of freedom.

8. The computer-assisted medical system of claim 1, wherein the controller is further configured to, based on detecting a disappearance of the abnormality, control the actuator based on a second articulation sensor signal.

9. The computer-assisted medical system of claim 8, wherein the controller is further configured to perform a gradual transition from controlling the actuator based on the articulation estimate to controlling the actuator based on the second articulation sensor signal, based on
    a stepped interpolation.

10. The computer-assisted medical system of claim 9, wherein the controller is configured to: after completion of the gradual transition, determine a second articulation estimate that corresponds to an actual articulation of the flexible catheter.

11. The computer-assisted medical system of claim 1, wherein the relationship comprises a gain.

12. The computer-assisted medical system of claim 1, wherein the articulation of the flexible catheter comprises a bending of a distal portion of the flexible catheter.

13. The computer-assisted medical system of claim 1, wherein the controller is further configured to:
    process the articulation sensor signals in a buffer configured to store a history of articulation sensor signal values,
    wherein the abnormality is detected when the buffer is depleted.

14. The computer-assisted medical system of claim 13, wherein the buffer operates as a moving average filter.

15. The computer-assisted medical system of claim 13, wherein the buffer is configured to hold a last known good articulation sensor signal value, and wherein the buffer is depleted when the last known good articulation sensor signal value is outdated.

16. The computer-assisted medical system of claim 1, wherein the articulation estimate comprises one or more of a position or a velocity.

17. A non-transitory machine-readable medium comprising machine-readable instructions that, when executed by one or more processors associated with a medical system, cause the medical system to:
    obtain articulation sensor signals from an articulation sensor, wherein the articulation sensor signals represent an articulation of a flexible catheter;
    obtain actuator sensor signals from an actuator sensor, wherein the actuator sensor signals represent movement of an actuator configured to drive articulation of the flexible catheter; and
    based on detecting an abnormality in a first articulation sensor signal:

temporarily switching from:
    using the articulation sensor signals to control the actuator
to:
    determining an articulation estimate based on a relationship between the movement of the actuator and the articulation of the flexible catheter caused by the movement of the actuator, applied to a first actuator sensor signal obtained from the actuator sensor, and
    controlling the actuator based on the articulation estimate.

18. A method for operating a medical system, comprising:
obtaining articulation sensor signals from an articulation sensor, wherein the articulation sensor signals represent an articulation of a flexible elongate device;
obtaining actuator sensor signals from an actuator sensor, wherein the actuator sensor signals represent movement of an actuator configured to drive articulation of the flexible elongate device; and
based on detecting an abnormality in a first articulation sensor signal:
    temporarily switching from:
        using the articulation sensor signals to control the actuator
    to:
        determining an articulation estimate based on a relationship between the movement of the actuator and the articulation of the flexible catheter caused by the movement of the actuator, applied to a first actuator sensor signal obtained from the actuator sensor, and
        controlling the actuator based on the articulation estimate.

19. The method of claim 18, further comprising, based on not detecting an abnormality:
    determining a second articulation estimate of the flexible elongate device based on the relationship between the movement of the actuator and the articulation of the flexible catheter caused by the movement of the actuator, applied to a second actuator sensor signal;
    determining an error correction based on a difference between the second articulation estimate and an actual articulation of the flexible elongate device, wherein the actual articulation is based on a second articulation sensor signal; and
    control controlling the actuator based on the second articulation sensor signal.

* * * * *